Figure 16:
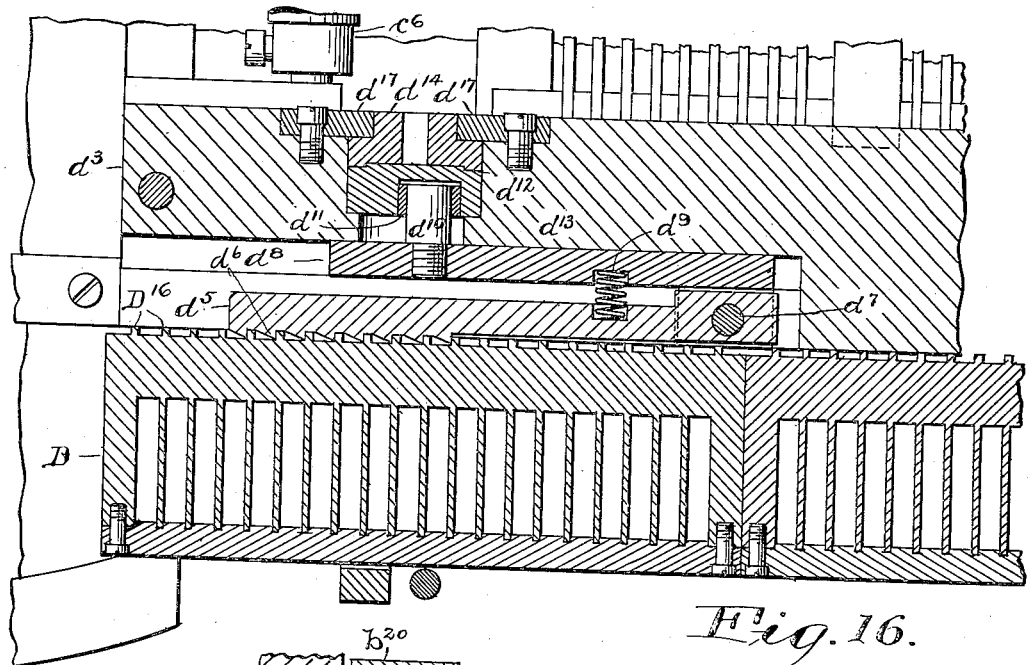

No. 890,264. PATENTED JUNE 9, 1908.
F. B. CONVERSE, Jr.
TYPE DISTRIBUTING MACHINE.
APPLICATION FILED JAN. 16, 1904.
14 SHEETS—SHEET 1.
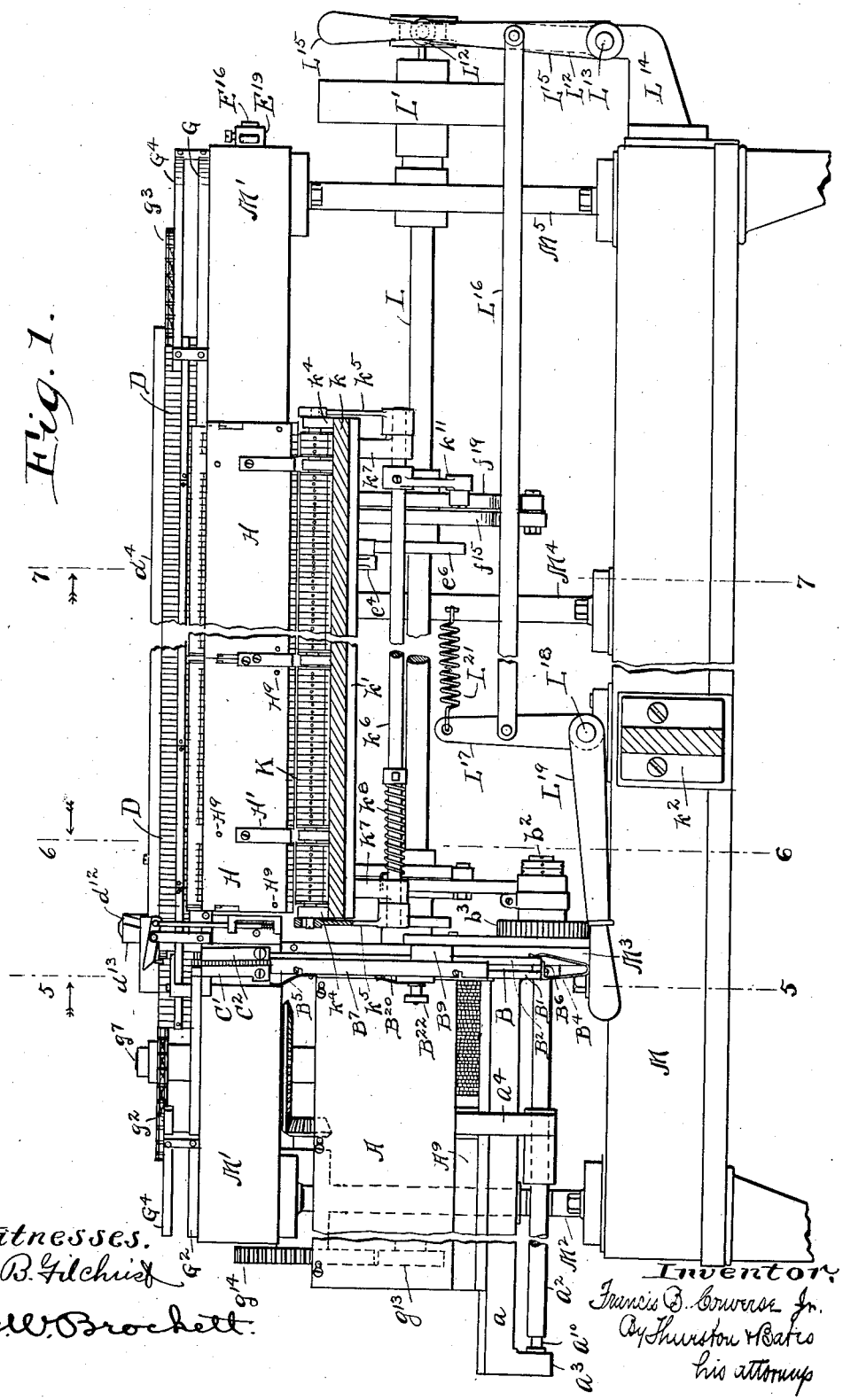

No. 890,264. PATENTED JUNE 9, 1908.
F. B. CONVERSE, Jr.
TYPE DISTRIBUTING MACHINE.
APPLICATION FILED JAN. 16, 1904.
14 SHEETS—SHEET 2.
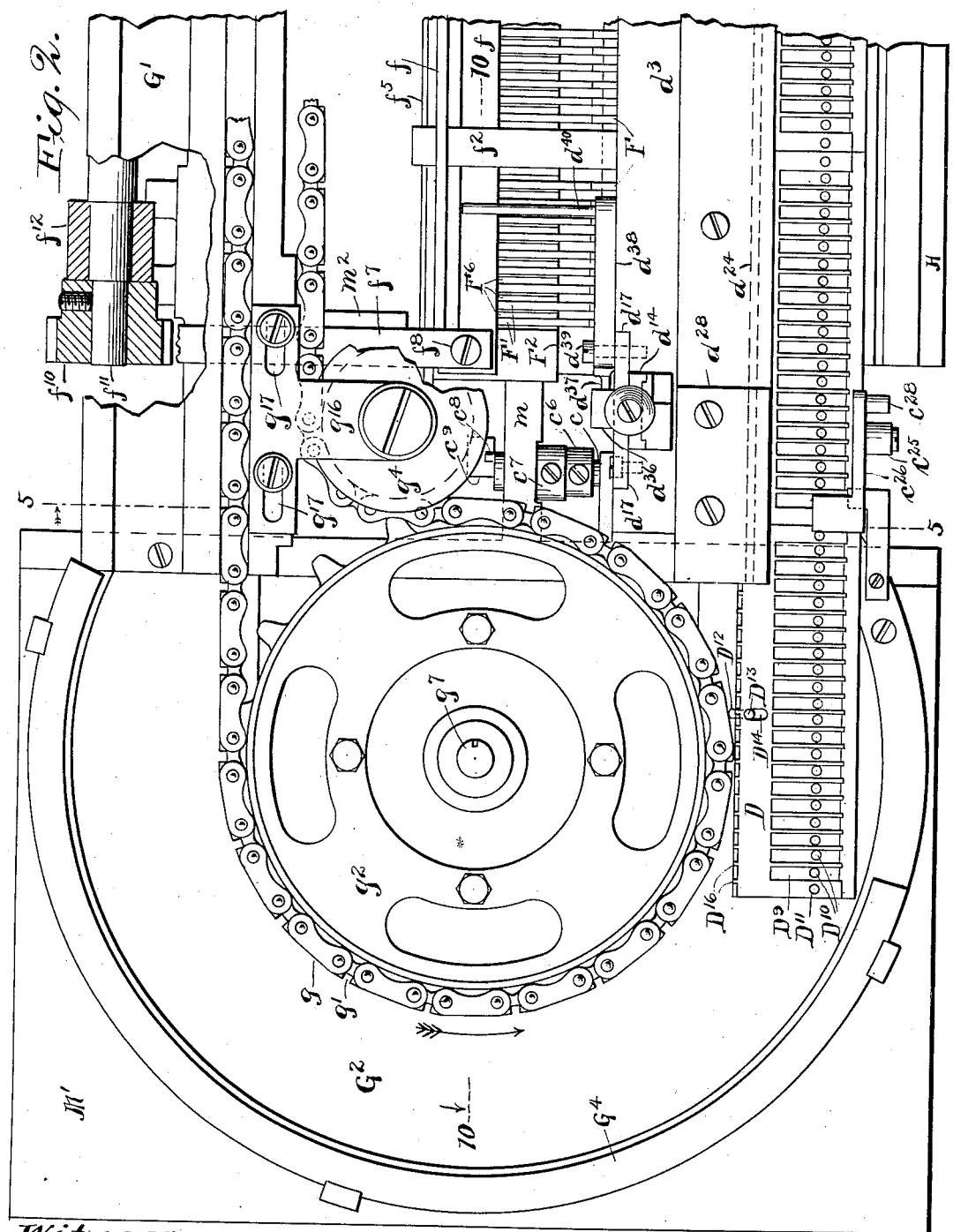

No. 890,264. PATENTED JUNE 9, 1908.
F. B. CONVERSE, Jr.
TYPE DISTRIBUTING MACHINE.
APPLICATION FILED JAN. 16, 1904.
14 SHEETS—SHEET 3.
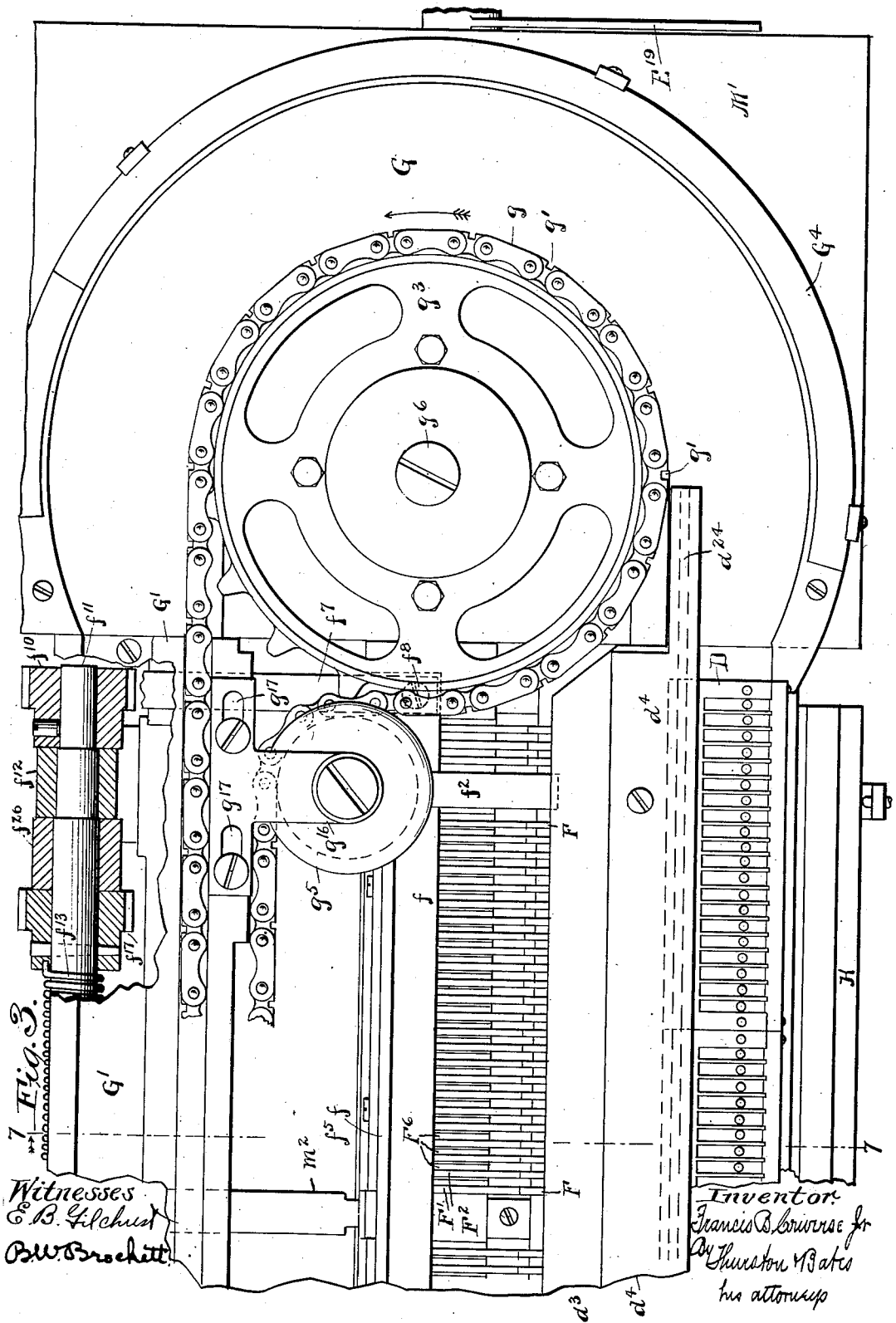

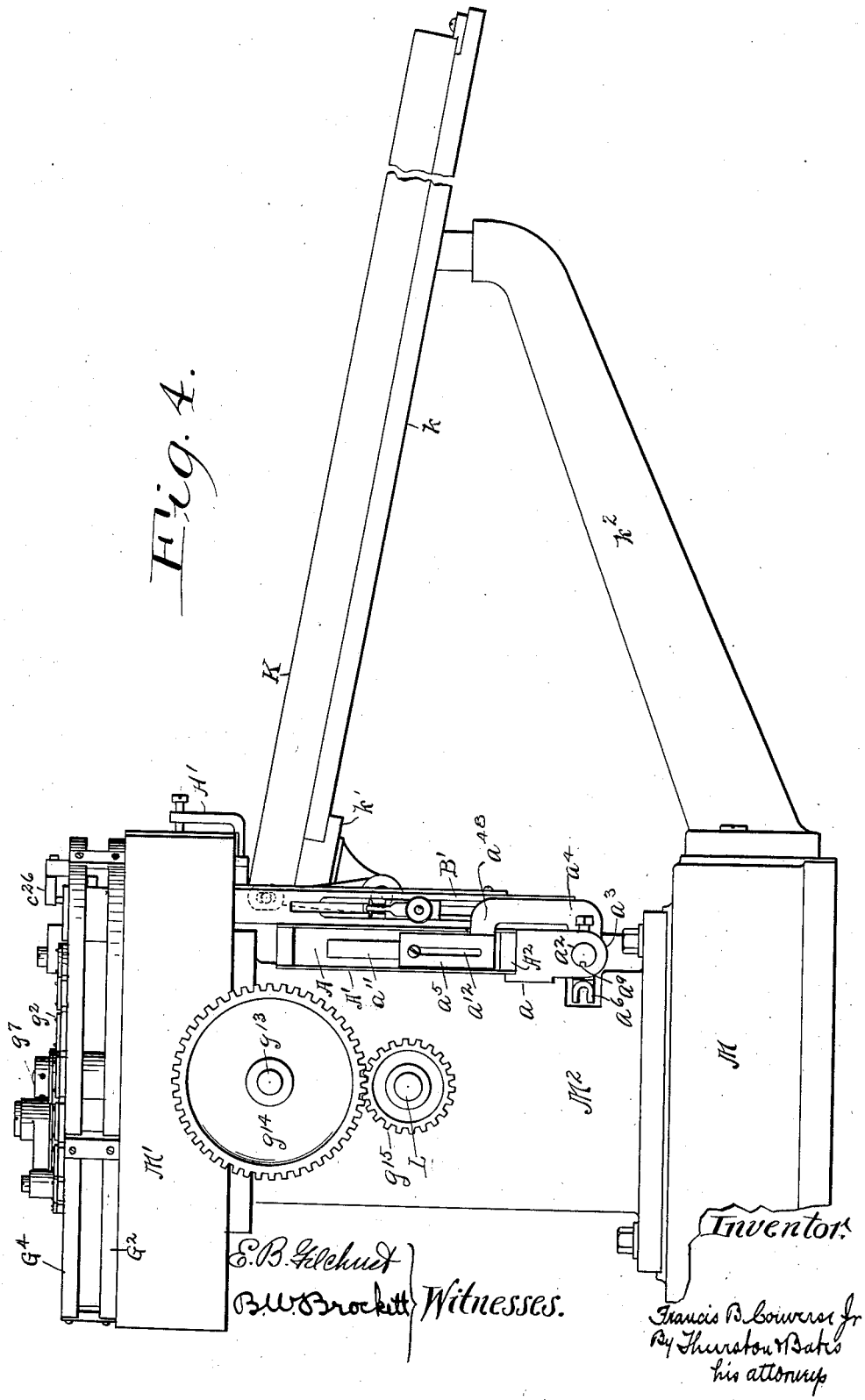

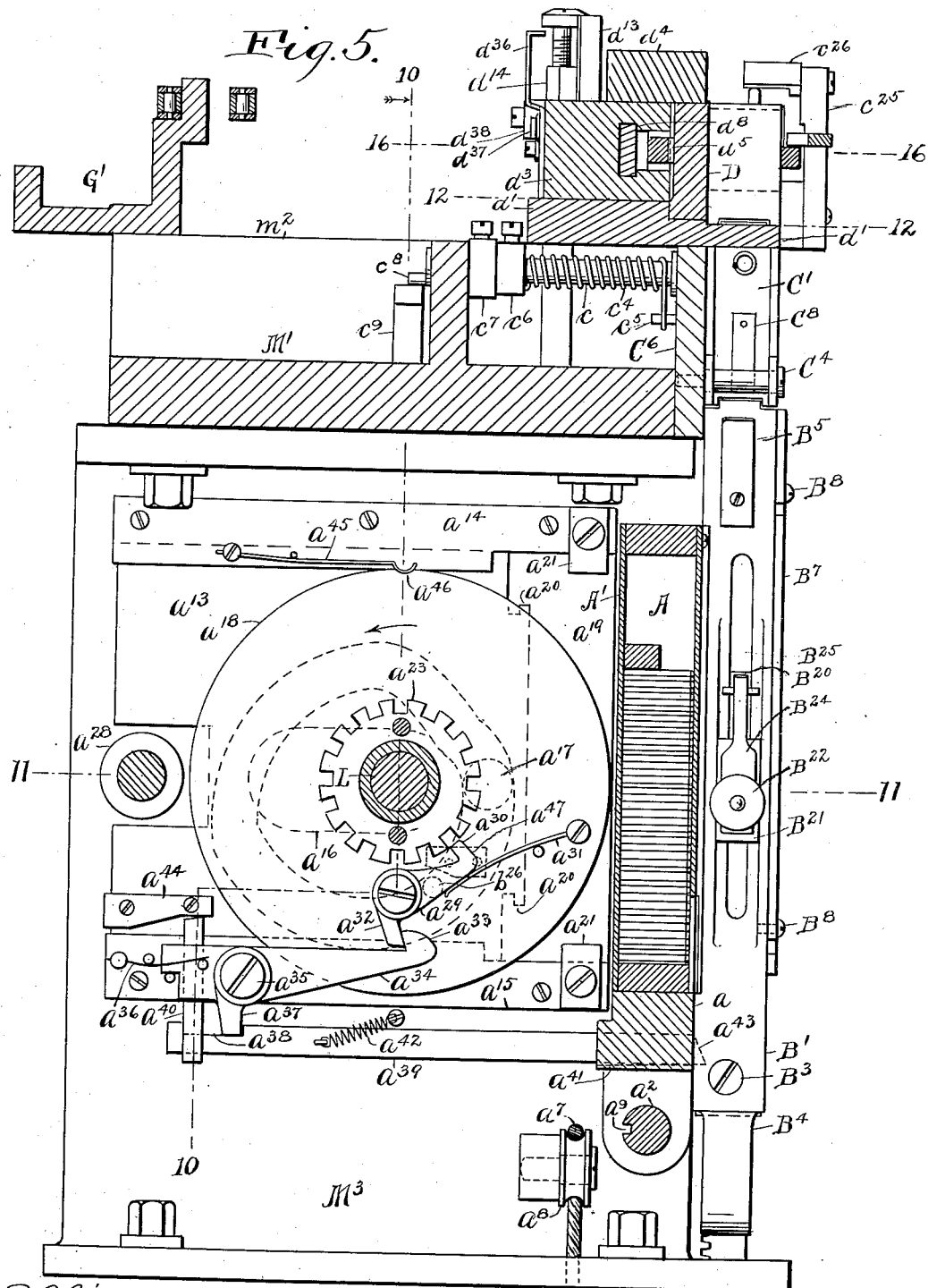

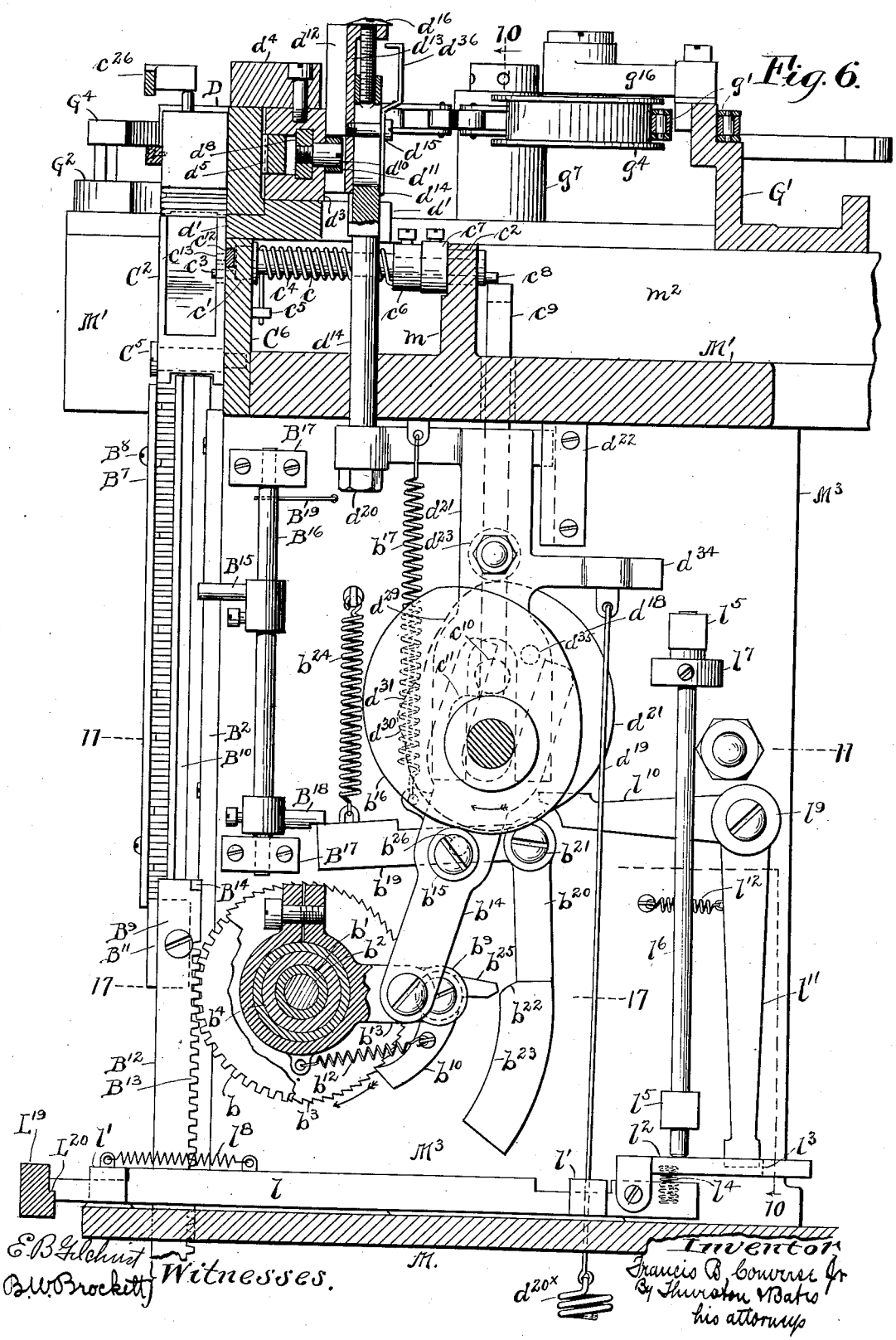

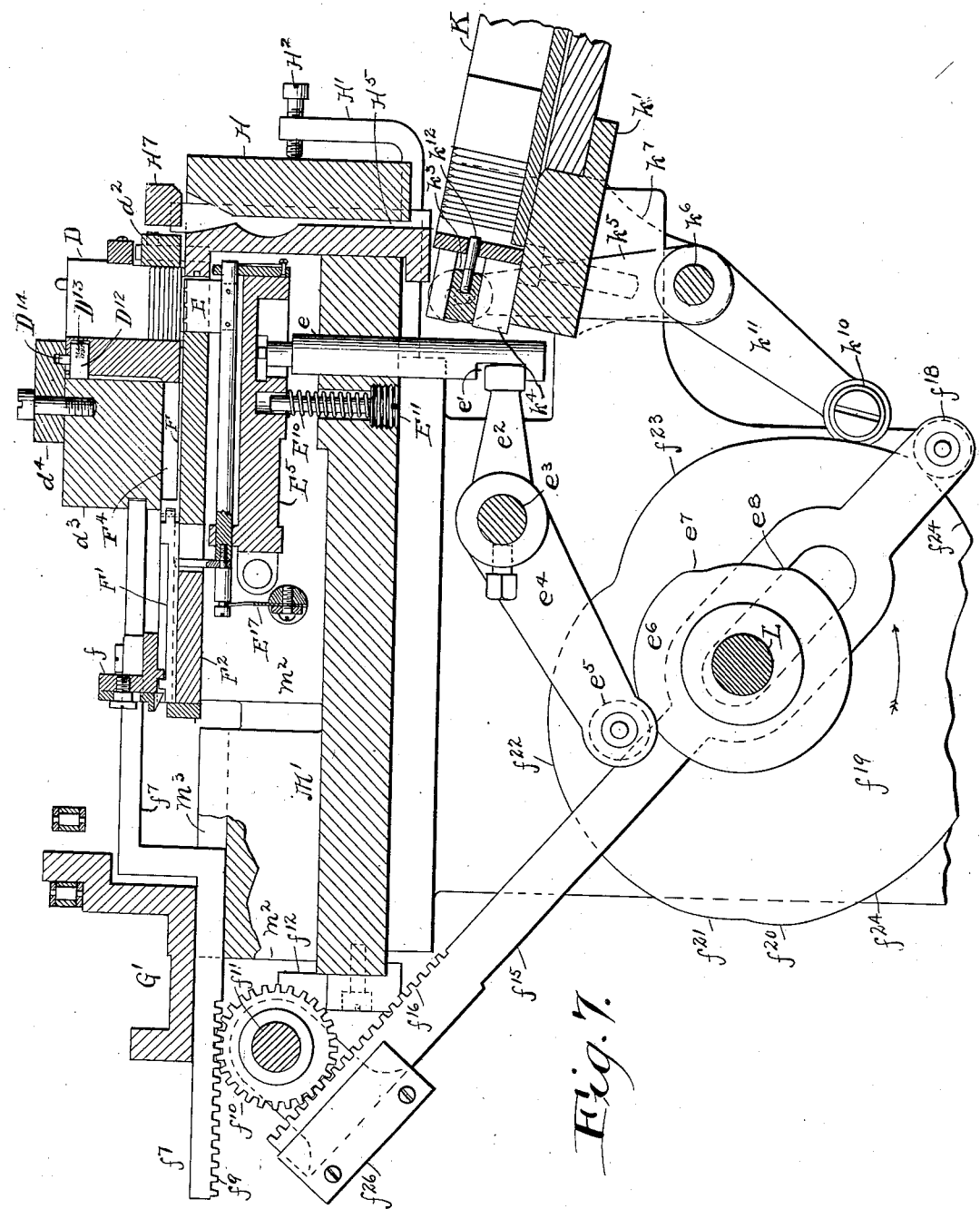

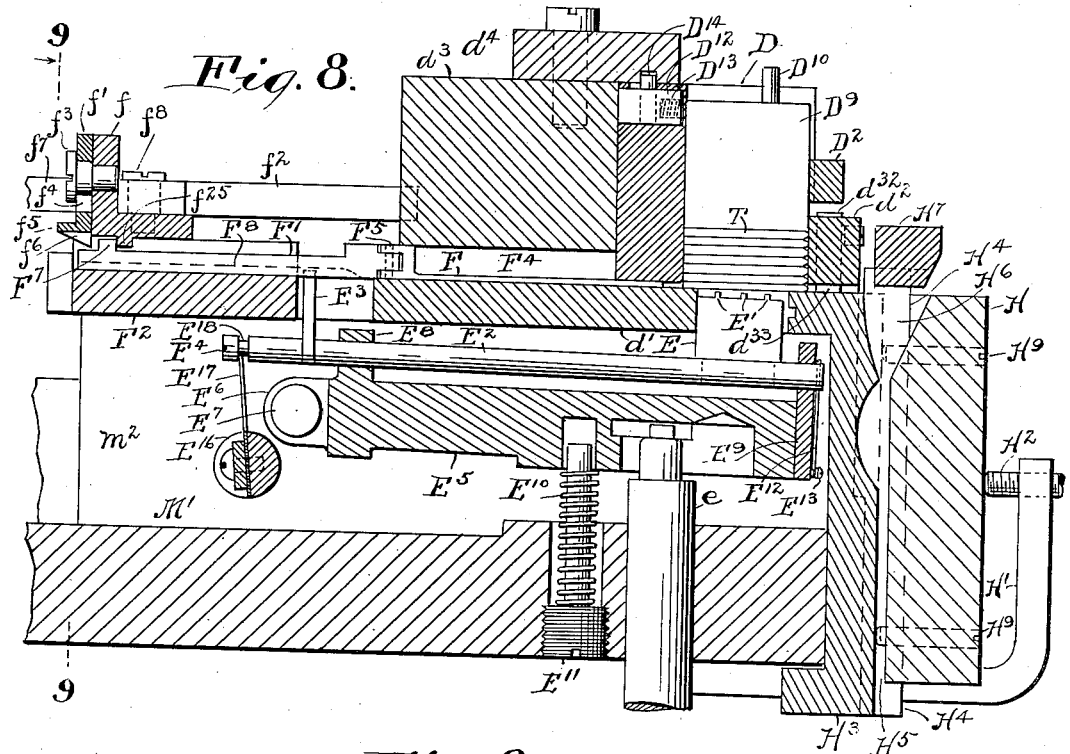

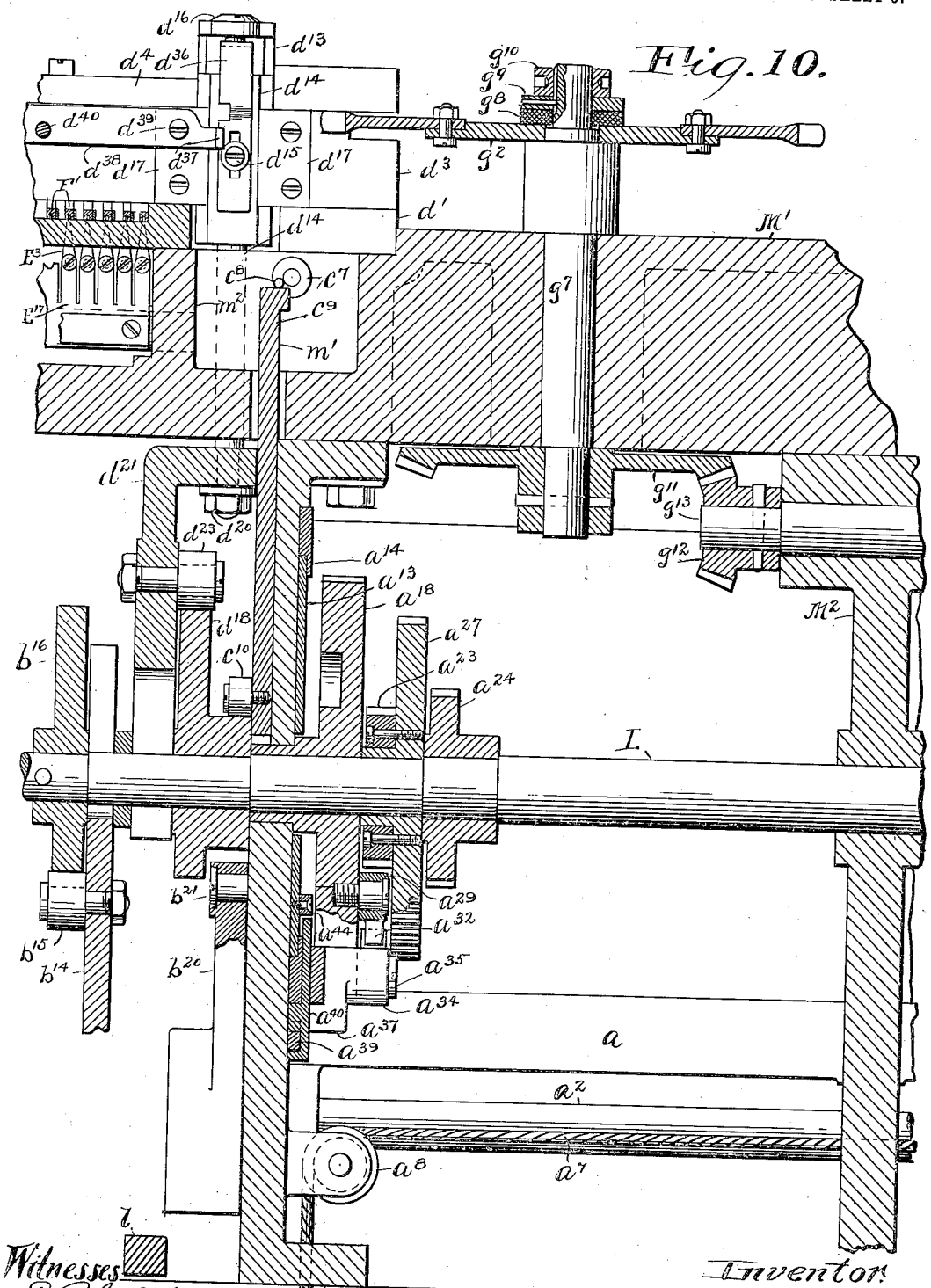

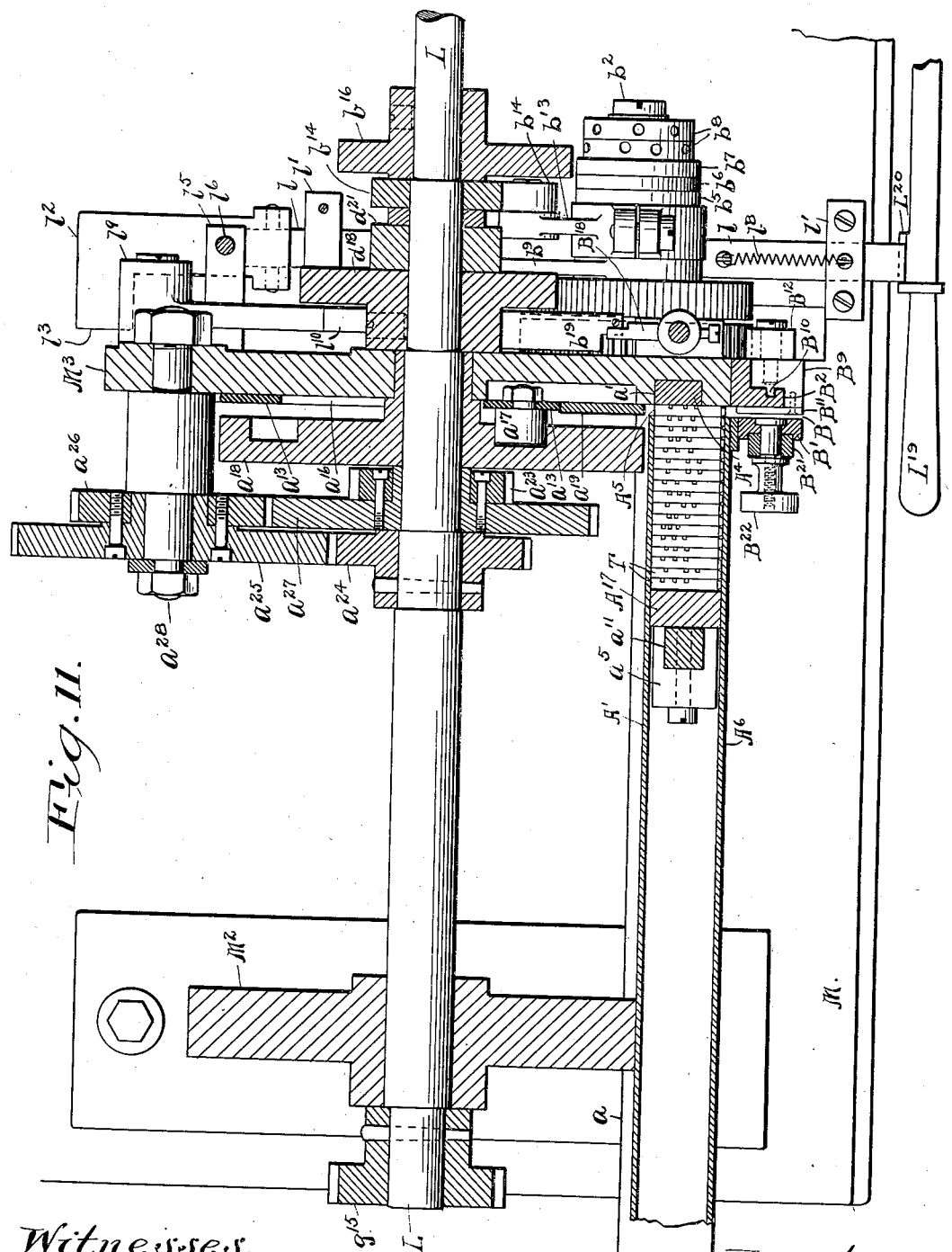

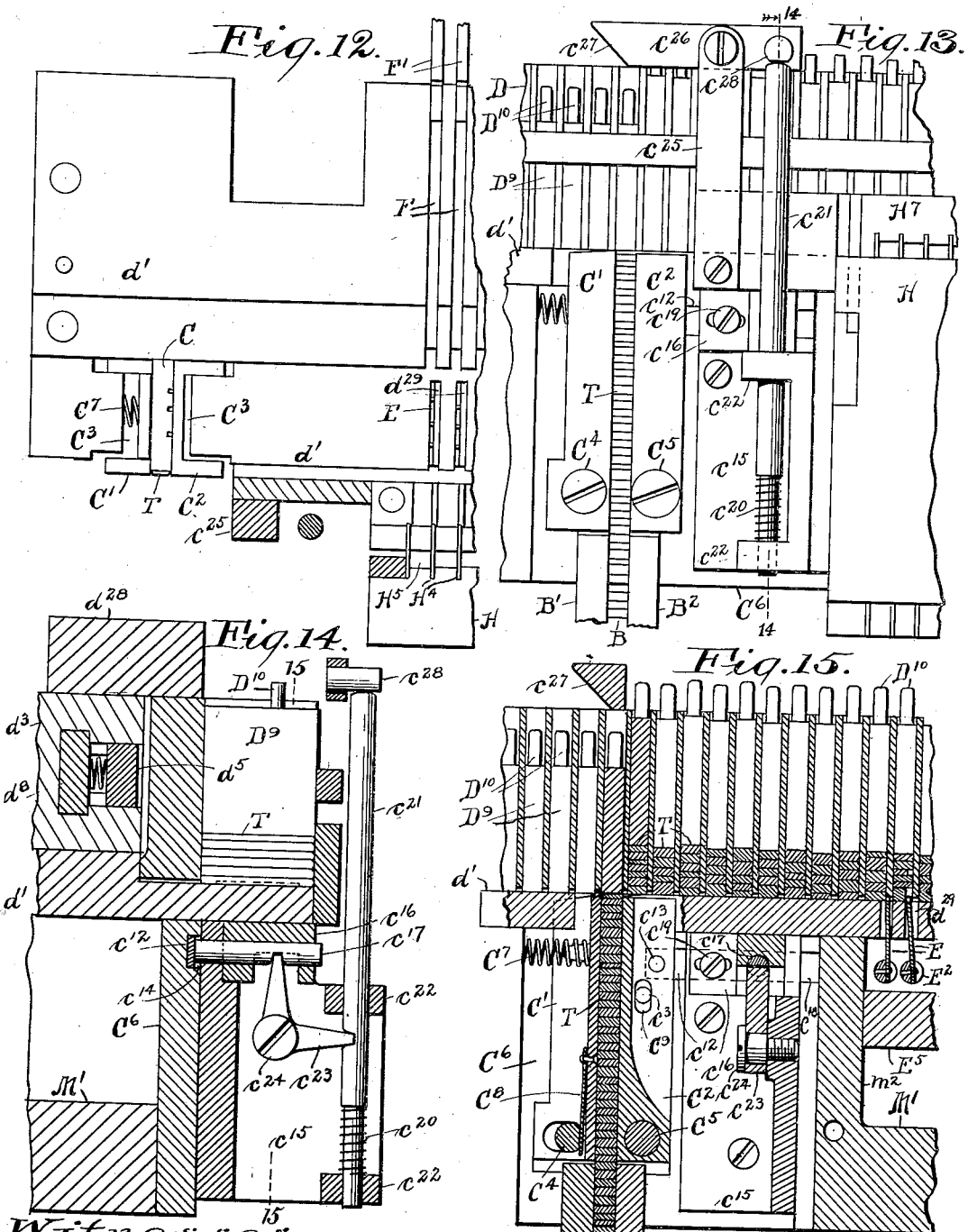

No. 890,264.

F. B. CONVERSE, Jr.
TYPE DISTRIBUTING MACHINE.
APPLICATION FILED JAN. 16, 1904.

PATENTED JUNE 9, 1908.

14 SHEETS—SHEET 12.

Witnesses.
E. B. Filchuish
B. W. Brockett

Inventor.
Francis B. Converse Jr.
By Thurston & Bates
his attorneys

No. 890,264. PATENTED JUNE 9, 1908.
F. B. CONVERSE, Jr.
TYPE DISTRIBUTING MACHINE.
APPLICATION FILED JAN. 16, 1904.
14 SHEETS—SHEET 13.
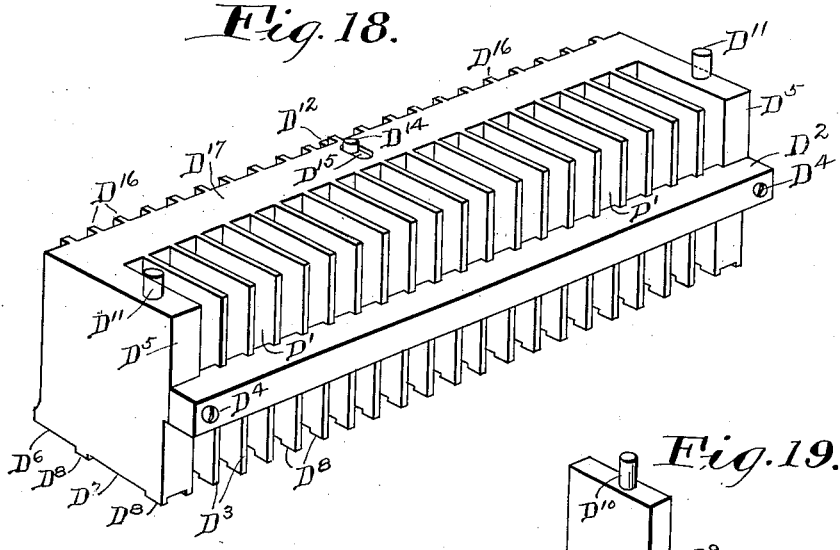
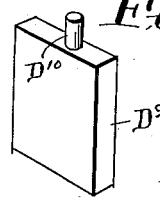
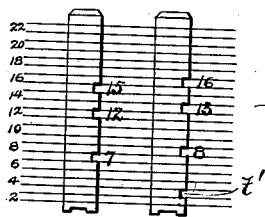
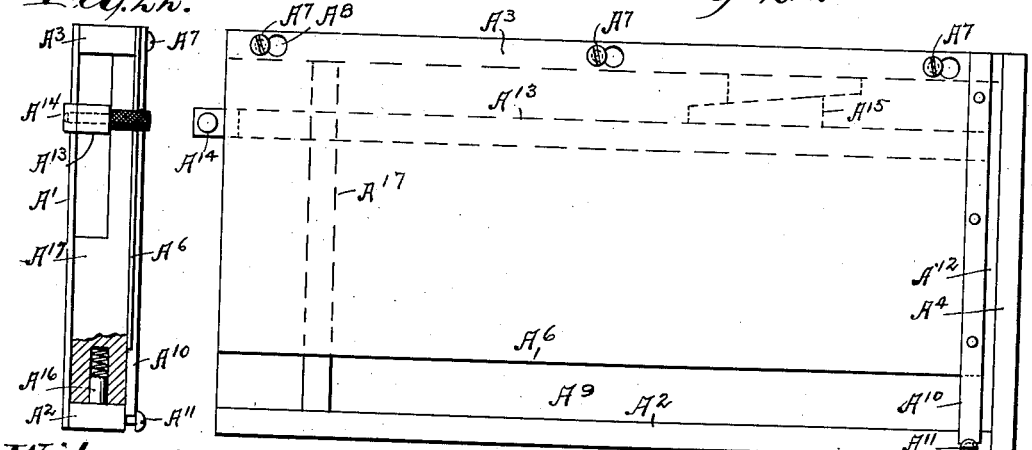
Witnesses.
E. B. Gilchrist
B. W. Brockett
Inventor
Francis B. Converse Jr
By Thurston + Bates
his attorneys

UNITED STATES PATENT OFFICE.

FRANCIS B. CONVERSE, JR., OF CLEVELAND, OHIO, ASSIGNOR, BY MESNE ASSIGNMENTS, TO MERGENTHALER LINOTYPE COMPANY, A CORPORATION OF NEW YORK.

TYPE-DISTRIBUTING MACHINE.

No. 890,264.  Specification of Letters Patent.  Patented June 9, 1908.

Application filed January 16, 1904. Serial No. 189,288.

*To all whom it may concern:*

Be it known that I, FRANCIS B. CONVERSE, Jr., a citizen of the United States, residing at Cleveland, in the county of Cuyahoga and State of Ohio, have invented a certain new and useful Improvement in Type-Distributing Machines, of which the following is a full, clear, and exact description, reference being had to the accompanying drawings.
The object of this invention is to provide a simple, efficient and rapid mechanism for distributing type, which shall be entirely automatic in its action, taking the type from a galley, separating it into lines and then removing each type at the proper place, and alining them in channels of type cases, each letter in its proper channel, ready to be used in a setting mechanism of any familiar form.
A further object of the invention is to provide a machine which shall separate type of one font (as, for example, italics) from type of another font (as Roman) when two fonts are used together, the same mechanism being used for the distribution of both fonts into their cases in a manner hereinafter fully pointed out and claimed.

In general terms, the operation of the machine is as follows: The type to be distributed, having nicks formed in their edges by means of which the selecting mechanism of the machine may distinguish between the different characters, is placed in a galley in the machine. Automatic mechanism feeds a line at a time from this galley into a mechanism which separates a given amount of type from the end of the line and inserts it into a channel adapted to receive it. A number of these channels (twenty in the present case) are grouped together, forming what I term a "carrier". A line of these carriers extends across the forward edge of the machine, and are moved along by a step-by-step movement the width of one channel at a time. The lowest type in each channel is, at each advance of the carriers, presented to the action of selecting mechanism, which controls the operation of ejectors, causing the presented type to be ejected when it reaches the proper selector. The type, as they are ejected, fall through channels which guide them into the proper channels of receiving cases. Each carrier, after it has passed all the selectors, is engaged by mechanism which carries it rapidly around a return track and adds it to the other end of the line of carriers, where it is replenished with type and started again through the selecting mechanism.

I will now give a detailed description of the best form of the machine at present known to me, reference being had to the accompanying drawings.

Figure 17:
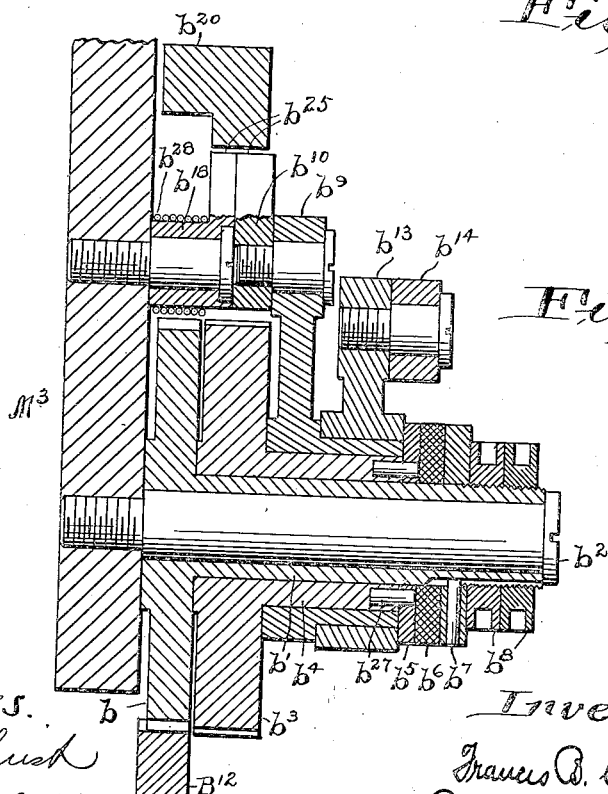
Figure 23:
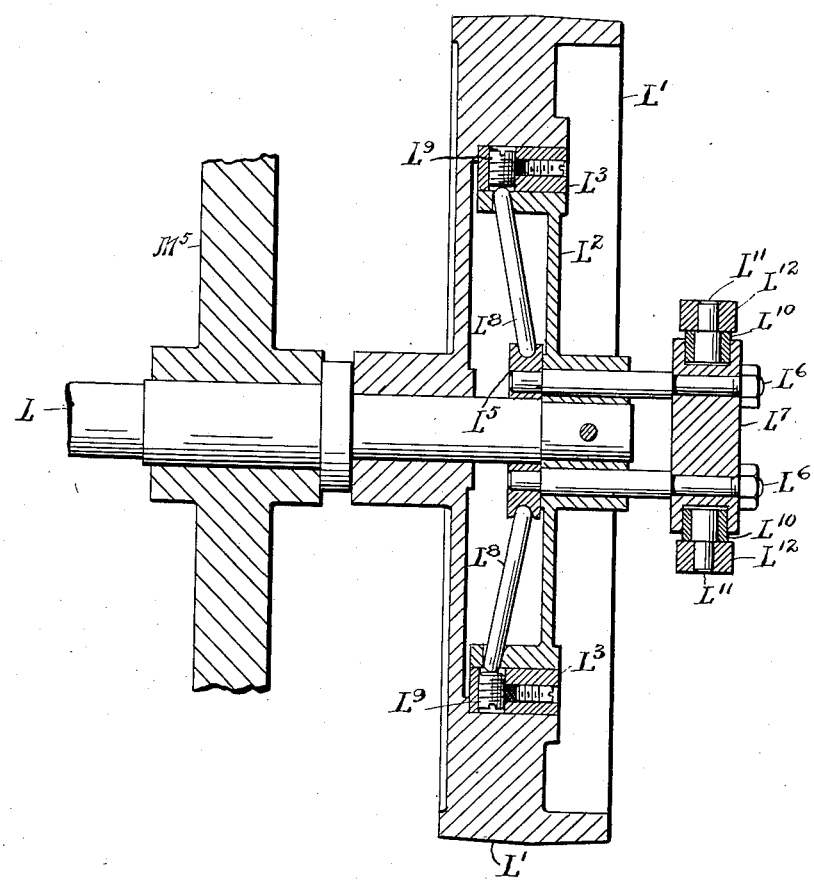

Figure 1 is the front elevation of the distributing machine, a portion through the center thereof being broken away; Fig. 2 is a plan of the left hand end of the machine; Fig. 3 is a plan of the right hand end of the machine, the portion of the machine not included in either of these views being a repetition of parts shown; Fig. 4 is a left hand end elevation; Fig. 5 is a cross section taken from the left on line 5—5 of Figs. 1 and 2; Fig. 6 is a vertical cross section taken from the right approximately on line 6—6 of Figs. 1 and 2; Fig. 7 is a vertical cross section taken from the left on line 7—7 of Figs. 1 and 3; Fig. 8 is an enlarged detail of parts shown in Fig. 7; Fig. 9 is a rear sectional elevation on line 9—9 of Fig. 8; Fig. 10 is a vertical longitudinal section taken from the rear on line 10—10 of Figs. 2, 5 and 6; Fig. 11 is a horizontal section on line 11—11 of Figs. 5 and 6; Fig. 12 is a horizontal section on line 12—12 of Fig. 5; Fig. 13 is a front elevation of the parts shown in Fig. 12; Fig. 14 is a vertical cross section taken from the left on line 14—14 of Fig. 13; Fig. 15 is a longitudinal section of the parts shown in Fig. 13 taken from the front on line 15—15 of Fig. 14; Fig. 16 is a horizontal section on line 16—16 of Fig. 5; Fig. 17 is a horizontal section on line 17—17 of Fig 6; Fig. 18 is a perspective view of one of the type carriers; Fig. 19 is a perspective view of a carrier-channel follower; Fig. 20 is a diagrammatic view showing the nicking employed on the type used in the machine; Fig. 21 is a front view of the type galley; Fig. 22 is an end elevation of the galley; and Fig. 23 is a horizontal section through the driving pulley.

The same reference letters are used throughout to indicate the same parts, which, for convenience, have been classified as follows; capitals and small letters of each denomination being used: A galley and galley feed mechanism. B cut-off channel and feed mechanism. C cut-off and operating mechanism. D carriers and advancing mechanism. E selectors and operating mechanism. F ejectors, operating bar and mechanism. G carrier return track and mechanism. H race plates. K type cases and table. L main shaft and power mechanism. M frame. T type.

*Frame.*—To a bed plate M suitably supported on legs are secured uprights $M^2$, $M^3$, $M^4$ and $M^5$, upon the top of which rests a horizontal frame plate $M^1$, which serves as a support for the principal carrier-operating and type-selecting and ejecting mechanism. A shaft L having bearings in each of the uprights $M^2$, $M^3$, $M^4$ and $M^5$, has upon its right hand end a driving pulley $L^1$, a belt connected with any suitable source of power and passing over this pulley being used to drive the machine. On this shaft are also secured the various cams hereinafter referred to, by which the different mechanisms are operated.

*Type carriers.*—The carriers D, (Figs. 1, 2, 3, 5, 6, 8 and 18,) which receive and carry type through the distributing mechanism, consist each of a block having a number of equally spaced channels $D^1$ cut through them. These channels are, from front to back, equal to the length of a type and their width is sufficient to receive the largest body of type which the machine is adapted to distribute. The carrier is any convenient height, its proportions being indicated in Fig. 16. The back wall $D^{17}$ is made thick enough for rigidity, and a notched piece $D^2$, fitting over the forward edges of the walls $D^3$ of the channels and secured by screws $D^4$, to the ends $D^5$ of the carriers, stiffen the channel walls. The lower surface of the carriers is formed as shown, the back wall and intermediate portion of the channel walls being cut away at $D^6$ and $D^7$ leaving the feet $D^8$ upon which the carrier rests. In each channel is a follower $D^9$ (Fig. 19) which is free enough in the channel to descend by its own weight. A pin $D^{10}$ projects from the upper edge of each of these followers. Pins $D^{11}$ also project from the upper edges of the end walls of the carriers. The channels are spaced apart equal distances, and the end walls are made of such thickness that when two carriers are placed end to end, the walls occupy the space of two channels, so that with a line of carriers adjacent to each other, each channel is accurately spaced from the first channel an exact multiple of the channel width. A pin $D^{12}$ (also Fig. 7) seated in a hole in the back wall of the carrier is pressed outward by a spring $D^{13}$ projecting from a hole in its end against the end of the hole in the carrier. A lug $D^{14}$ projecting from the pin $D^{13}$ through a slot $D^{15}$ in the upper face of the carrier, prevents the pin from being projected further than the desired distance. Teeth $D^{16}$ are formed on the back side of the carrier, by means of which the carriers are advanced through the machine, as is hereafter described. One more than enough of these carriers are provided to form a continuous line throughout the operating portion of the machine when placed end to end, as shown in Figs. 1, 2 and 3. A race way for these carriers is formed between the plate $d^1$, the rail $d^2$, the bar $d^3$ and upper plate $d^4$, Figs. 5, 6, and 8, in which the carriers fit nicely and through which they are advanced by an amount equal to the width from one channel to the next, with each revolution of the main shaft of the machine. A track leads from the right hand end of this raceway around the semicircular path G, Figs. 1, 2 and 3, the straight path $G^1$, and the semicircular path $G^2$, connecting with the left hand end of the race way. The carriers are advanced a step at a time by a pawl $d^5$, Figs. 6 and 16, having teeth $d^6$, adapted to engage the teeth on the rear of the carriers. This pawl is pivoted at $d^7$ to ears projecting from a slide $d^8$ guided in a groove in the rear wall $d^3$ of the race-way; and is pressed forward into engagement with the carrier teeth by a spring $d^9$. A stud $d^{10}$ secured to this slide projects through a slot in the rear wall of the race way, and carries a roll $d^{11}$ which is engaged by an inclined cam groove $d^{12}$ in a plate $d^{13}$ (also Figs. 1 and 10). This plate is seated in a vertical groove in the wall $d^3$, and is adjustably secured to the operating bar $d^{14}$, by a screw $d^{15}$ passing through a slot in the bar, and by an adjustment screw $d^{16}$ Gibs $d^{17}$ hold these parts in position, permitting them to receive vertical movement communicated to them by the cam $d^{18}$ and spring $d^{20 \times}$. The operating bar $d^{14}$ passes down through a hole in the frame $M^1$, and is secured by a nut $d^{20}$ to the irregular shaped link $d^{21}$ which yokes around the shaft L, and is held in place by a gib $d^{22}$ secured to the frame $M^3$. This link carries a roll $d^{23}$ which bears on the cam $d^{18}$, on the shaft L. A wire $d^{19}$ secured o the link passes through a hole in the bed plate M and is attached to the spring $d^{20 \times}$. The other end of this spring (not shown) is secured to lower part of the frame. As the increasing face $d^{29 \times}$ of the cam $d^{18}$ passes the roll, the link is lifted, causing the cam groove $d^{12}$ to move the pawl $d^5$ to the left, to engage teeth of the carrier; whereupon, as the decreasing faces $d^{29}$ and $d^{30}$ of the cam come under the roll, the spring $d^{20}$ causes the pawl to move to the right advancing the carrier engaged by the pawl and thereby all of the carriers upon the race way, to the right a distance equal to the width of a channel. The carriers are thus advanced by a step-by-step movement through out the length of the race-way.

As each carrier reaches the right hand end of the race-way, the lug $D^{14}$ projecting from the pin $D^{13}$ carried by the carrier, passes out from the end of the groove $d^{24}$ in the upper plate $d^4$ of the race way, in which groove the lug has been traveling. This permits the pin $D^{12}$ to be projected by its spring, to engage a notch $g^1$ in one of the links of a chain $g$, (Figs. 1, 2 and 3.) This chain is carried by sprocket wheels $g^2$ and $g^3$, and by the adjustably supported idlers $g^4$ and $g^5$, and is driven continuously in the direction of the arrows in Figs. 2 and 3. The right hand sprocket $g^3$ turns idly on a stud $g^6$ fixed to the frame. The left hand sprocket is driven frictionally by the shaft $g^7$, (Figs. 2 and 10,) friction between the shaft and sprocket being obtained by a leather washer $g^8$, collar $g^9$, and the adjustment nut $g^{10}$. The shaft $g^7$ carries at its lower end the bevel gear $^{11}$, which meshes with the bevel gear $g^{12}$. This latter gear is on a horizontal shaft $g^{13}$, having a bearing in the frame $M^2$, and carries on its outer end a spur gear $g^{14}$, Fig. 4, in engagement with a pinion $g^{15}$ on the left hand end of the main shaft L. The chain is thus driven at a rate of speed sufficient to convey a carrier around the return track and add it to the left hand end of the line of carriers in slightly less time than the carriers in the raceway require to travel the length of one carrier. Guide rails $G^4$ under which the bars $D^2$ across the front of the carriers travel, prevent the carriers from tipping up while passing around the semicircular portions of the track. A block $d^{28}$, Figs. 2 and 14, secured to the back bar $d^3$ of the race way presses with some friction on the top of the end carrier in the race-way to prevent any backward motion of the carrier as the pawl returns for a new engagement with the carrier teeth.

The idler pulleys $g^4$ and $g^5$ are carried on brackets $g^{16}$, adjustably secured to the return track $G^1$ by screws passing through slots $g^{17}$ by which means the chain can be adjusted to take up undue looseness. As the chain is made to travel at a speed sufficient to return the carrier from the right hand end of the line of carriers to the left hand end in slightly less time than the line of carriers requires to travel the length of one of the carriers, the frictional drive of the chain permits the chain to stop after the just returned carrier abuts against the end of the line of carriers, until the advancing pawl has moved the line of carriers a sufficient distance to cause the disengagement of the pin $D^{12}$ from the chain. Means for supplying to these carriers the type to be distributed will now be described.

*Galley and feeding mechanism.*—The type to be distributed are placed in column form in a galley A, (Figs. 1, 4, 5, 11, 21 and 22,) which is removable from the machine. The mechanisms hereinafter described remove the type a line at a time from this galley and advance it to the selecting mechanisms. This galley consists of a back plate $A^1$, with sides $A^2$ and $A^3$, and end $A^4$, affixed thereto. The end opposite the end piece $A^4$ is left open.

The back plate ends short of the end piece $A^4$, (as shown in Fig. 11 (leaving a slot $A^5$ through the back of the galley adjacent to the end, of a width substantially equal to the body of the type. A cover plate $A^6$, is held in place over the galley by the screw heads $A^7$ taking through the openings $A^8$. This cover plate is somewhat narrower than the galley, leaving an opening $A^9$ along one side of the galley, but covering the galley sufficiently to prevent the type from falling out in the necessary handling of the galley. The lower edge of the cover plate is supported by the bar $A^{10}$, secured to the forward end of the cover plate and hooking under the screw head $A^{11}$. The cover plate when in place ends short of the end piece $A^4$, leaving a slot $A^{12}$ through which a line of type may be advanced by an ejector, hereinafter referred to, which operates through the slot in the back of the galley.

The type to be distributed is placed in this galley, adjacent to the side $A^2$, two or more columns being put therein adjacent to each other when the columns are less than half the width of the galley. A side stick $A^{13}$ is placed along the free side of the type to hold them in place, this stick being secured by a screw-clip $A^{14}$, at the open end of the galley and by wedge-quoins $A^{15}$, which are adjusted to hold the side-stick lightly against the type. This side stick is less in height than the type. A foot-stick $A^{17}$, is placed at the end of the column of type, overhanging the side stick as shown. A spring plunger $A^{16}$, pressing against the side of the galley creates sufficient friction to hold the foot sticks in place. The cover being placed upon the galley and secured as described, the galley, so filled with type, is placed in the machine at A, Figs. 1 and 4, its side resting upon the rail $a$, which is secured to the frames $M^2$ and $M^3$. The end piece $A^4$ of the galley enters a slot $a^1$ in the vertical frame $M^3$ (see Fig. 11) bringing the inside of this end of the galley flush with the left hand face of the frame.

Just below the rail $a$ and parallel therewith, is a round rod $a^2$, supported at its right hand end in the frame $M^3$, and at its other end in a lug $a^3$ depending from the rail. Slidable upon this rail is the galley follower $a^4$, having a hub surrounding the rod, and an upwardly extending arm $a^5$, adapted to enter the galley to press forward the type therein against the right hand end of the galley. The length of the portion of this follower within the galley is made adjustable by means of a bar $a^{11}$ held in a groove in the face of the follower by means of a screw passing through the slot $a^{12}$. The follower is bent off at right angles in the form shown, the horizontal portion $a^{48}$ passing through the opening below the galley cover. A cord $a^7$ secured to a rearwardly projecting lug $a^6$ on the galley follower hub, passes over a grooved roller $a^8$, on a lug of the frame $M^3$ and through a hole in the bed plate; and has secured to its end a weight (not shown) sufficiently heavy to advance all the type in the galley toward the right when permitted to do so. A groove $a^9$ in the rod $a^2$, guiding a spline in the hub of the follower, causes the follower to maintain its proper position in the galley. When the follower is drawn to the left clear of the galley, the spline passes out of the groove $a^8$ into the annular groove $a^{10}$ in the rod. A slight rotation of the follower on the rod causes the spline to pass out of alinement with the groove $a^9$ and to engage the end of the groove $a^{11}$ to maintain the follower in position while the galley is being removed or inserted.

When the galley is in position in the machine, the first line of type in the galley stands in front of an ejector plate $a^{13}$, and directly behind a channel B, (Figs. 1 and 11). This channel is hereafter referred to as the "cut-off channel". The ejector-plate is carried by gibs $a^{14}$ and $a^{15}$ on the left hand side of the frame $M^3$. It is made in two parts, the main rear portion $a^{13}$, and the forward portion $a^{19}$ removably secured thereto by the hooks $a^{20}$, and suitably guided by the clips $a^{21}$. When distributing a different font, the part $a^{19}$ may therefore be readily changed for another similar part of different thickness, corresponding to the thickness of the body of the type to be distributed. The rear portion of the ejector plate is pierced by an opening $a^{16}$, to permit the main shaft L to pass through it; and it carries a roll $a^{17}$ engaged by the groove of a groove-cam $a^{18}$. This cam is loosely mounted on the shaft L. A clutch $a^{23}$, adjacent to the cam $a^{18}$, operating at the proper time (as hereinafter fully described), causes the cam to make one complete revolution. The rotation of this cam advances the ejector plate to eject a line of type forward, out of the galley and into the cut-off channel B, and then returns the plate to its original position. The weight of the cord secured to the follower advances the column of type in the galley as the plate is withdrawn to bring the succeeding line into the path of the ejector. The line of type having been ejected into the cut-off channel, it is fed upward by mechanism, now to be described, to a mechanism which separates a number of type from the end of the line, and inserts them in a carrier channel. This separating mechanism I term the "cut-off."

*Cut-off channel and feeding mechanism.*—
The cut-off channel B is formed between two bars $B^1$ and $B^2$, (Figs. 1, 5, 6, and 11;) the bar $B^2$ being rigidly secured to the front edge of the frame $M^3$; the bar $B^1$ is supported by a screw $B^3$, projecting from the bar $B^2$, and passing loosely through a hole in the bar $B^1$. A U-shaped spring $B^4$, secured to the lower end of the bar $B^1$ engages the opposite side of the bar $B^2$, and a flat spring $B^5$ secured near the upper end of the bar bears against a projection of the frame $M^1$, these two springs tending to press the bar $B^1$ against the fixed bar. At the commencement of the operation of the machine, a type of the same body as the type to be distributed is placed between the bars near their upper ends and another one between the bars at their lower ends on the lug or plate $B^6$, formed to receive it. A channel is thus opened between the bars of just the width of the type and is thereafter maintained by the type that is being distributed. The channel is covered by a removable plate $B^7$ held in place by screws $B^8$.

A block $B^9$, slidably mounted on the bar $B^2$ and guided by a spline in the groove $B^{10}$, in the bar, carries a pusher plate $B^{11}$, which at the time of the insertion of a line of type into the channel, stands at the lower end of the channel, so that the line is received upon the upper face of this plate. Secured to the block $B^9$ is a rack bar $B^{12}$, having gear teeth $B^{13}$ in mesh with a gear $b$. The lower end of this bar passes down through, and is guided by an opening in the bed plate M.

The gear $b$, just referred to, has a long hub $b^1$, (Fig. 17), and is rotatably mounted on a stud $b^2$, secured to the frame $M^3$. Rotatably mounted on the hub of this gear is a ratchet $b^3$, provided with teeth as shown. This ratchet has an elongated hub $b^4$ to the end of which is secured, by means of pins $b^{27}$, a collar $b^5$. Adjacent to this collar is a washer $b^6$, of leather or other similar material, and bearing against this washer is a collar $b^7$, surrounding the extending end of the hub of the gear, and pressed into frictional contact with the washer by the nuts $b^8$, $b^8$, on the end of the gear hub. A pin in the collar $b^7$, engaging a groove in the gear-hub, prevents the collar from turning independently of the gear.

Between the ratchet and the collar $b^5$ is a lever-arm $b^9$, loosely mounted on the hub of the ratchet. This arm carries a pawl $b^{10}$, of the form shown in Fig. 6, adapted to operate the ratchet in the direction of the arrow, a spring $b^{12}$ holding the pawl normally in engagement with the ratchet. Secured to the hub of this lever arm is the lever arm $b^{13}$, to which is pivoted the link $b^{14}$, which yokes around the shaft L and carries a roll $b^{15}$, acted upon by a cam $b^{16}$, secured to the shaft. A spring $b^{17}$, secured to the link and to the frame causes the roll to follow the eccentricity of the cam.

Directly behind the pawl $b^{10}$, as seen in Fig. 6, is another pawl $b^{18}$ of the same shape, pivoted to the frame $M^3$ and held in engagement with the ratchet $b^3$ by a spring $b^{28}$ coiled about its hub, to prevent retrograde movement of the ratchet, except when both pawls are released. During the insertion of the line of type into the cut-off channels, as heretofore explained, the pusher $B^{11}$ is at its lowest position, the pawls $b^{10}$ and $b^{18}$ being held out of operative position by means hereafter to be described. These pawls are then permitted to return to their operative position, whereupon, the increasing face of the cam $b^{16}$ passing the roll $b^{15}$, the pawl $b^{10}$ is depressed, rotating the ratchet $b^3$ in the direction of the arrow in Fig. 6. This movement is communicated through the collars $b^5$ and $b^7$ to the gear $b$, elevating the rack-bar $B^{12}$, and with it the line of type, by a lifting force, the amount of which is determined by the pressure of the set nuts $b^8$, against the collar $b^7$. When the upward movement of the type is impeded (as it is in the manner hereafter to be described) the frictional connection between the ratchet $b^3$ and the gear $b$ permits the former to make its full movement irrespective of the point at which the follower and gear are stopped. The type is thus pushed upward in the cut-off channel and through the cut-off, a variable amount of type (with a maximum of say three-eighths inch) being cut off from the end of the line and inserted in a channel of the carriers at each revolution of the machine, as hereinafter described.

When the lower end of the type line has thus been elevated an amount slightly in excess of the length of the line, a bevel $B^{14}$, on the upper right hand side of the rack bar $B^{12}$, comes behind an arm $B^{15}$ secured on the rod $B^{16}$, causing the rod to be rocked slightly. This rod has bearings in the blocks $B^{17}$, $B^{17}$, and has a rearwardly extending arm $B^{18}$ near its lower end. This arm normally engages the horizontal arm $b^{19}$ of a bell crank lever $b^{20}$, pivoted to the frame $M^3$ at $b^{21}$. The downwardly extending arm of this bell crank lever has a beveled face $b^{22}$, below which is a curved portion $b^{23}$, the arc of this curve being struck approximately from the center of the stud $b^2$, above referred to. A spring $b^{24}$, attached to the arm $b^{19}$ and to the frame $M^3$, tends to swing the arm upward, the parts being held normally in the position shown in Fig. 6 by the arm $B^{18}$, above referred to. As the pusher $B^{11}$ reaches the upward limit of its travel, the bevel $B^{14}$ on the rack-bar $B^{12}$ strikes the arm $B^{15}$ rocking the rod $B^{16}$ and causing the arm $B^{18}$ to release the bell-crank arm $b^{19}$. The spring $b^{24}$ thereupon swings the lower arm into the path of the rearwardly extending lugs $b^{25}$ on the pawls $b^{10}$ and $b^{11}$. The bevel $b^{22}$, on the next downward movement of the pawl $b^{10}$, forces the pawls from engagement with the ratchet $b^3$, allowing the pusher to descend under the action of gravity to its lowest position in the cut-off channel, to permit the introduction of a new line into this channel. The upper end of a pawl $B^{20}$ pivoted to a block $B^{21}$ adjustably secured to the side of the cut-off channel by a set screw $B^{22}$, (Figs. 1, 5 and 11,) is pressed by a spring $B^{24}$ through a slot $B^{25}$. This pawl is adjusted with its upper end just below the upper limit of travel of the pusher, and it drops in below the type in the channel as the lower end of the line passes above it, and retains the type in the upper end of the cut-off channel while a new line is being inserted. The position of the trip-arm $B^{15}$ on the rod $B^{16}$ and of the pawl $B^{20}$ are adjustable up and down to accommodate them to various lengths of lines.

When the pusher descends, as just described, it throws the clutch mechanism operating the line ejector plate $a^{13}$, by means now to be described. A clutch disk $a^{23}$, having square notches cut in its edge, as shown in Fig. 5, is continuously rotated on the shaft L, at a slower rate of speed than that of the shaft by the gears $a^{24}$, $a^{25}$, $a^{26}$, and $a^{27}$. Of these, the gear $a^{24}$ is secured on the shaft L and drives the gear $a^{25}$ secured to the gear $a^{26}$, both of which turn idly on the stud $a^{28}$ secured to the frame $M^3$, the latter gear meshing with and driving the gear $a^{27}$, to which is secured the clutch disk. Thus, while the clutch disk is carried on this shaft L, its rate of rotation is about one-third that of the shaft, it not being desirable to operate the ejector plate as rapidly as would be the case were the clutch disk driven directly by the shaft.

Pivoted to the cam $a^{18}$ is a pawl $a^{29}$ having an upwardly extending nose $a^{30}$ adapted to be pressed by the spring $a^{31}$ into engagement with the notches of the clutch disk. It is held out of such engagement by the downwardly extending lug $a^{32}$ which is engaged by the hooked end $a^{33}$ of an arm $a^{34}$ pivoted at $a^{35}$ and held normally in position to engage the clutch pawl by the spring $a^{36}$. This arm has a downwardly extending lug $a^{37}$ projecting into a notch $a^{38}$ in a bar $a^{39}$ which is guided at its forward end in a groove $a^{41}$ in the end of the galley supporting rail $a$, and supported at its rear end in a notch in the piece $a^{40}$. The notch $a^{41}$ is wide enough to permit a slight upward and downward movement of the rear end of the rod. A spring $a^{42}$, pulling at an angle as shown, holds this bar normally in its upward and forward position. The forward beveled end $a^{43}$ of the bar projects into the cut-off channel in such position as to be met by the lower rear corner of the pusher $B^{11}$ as the latter descends, and is thereby pushed rearward, the corner of the notch $a^{38}$ meeting the lug $a^{37}$ of the clutch-pawl trip arm $a^{34}$, thereby swinging the forward end of this arm downward to release the clutch pawl which is immediately pressed into engagement with a notch of the clutch disk, causing the cam $a^{18}$ to rotate, thereby advancing a line of type into the cut-off channel as heretofore described. As the ejector plate advances, a beveled piece $a^{44}$ secured to this plate passes over the upper end of the piece $a^{48}$, depressing it, thereby releasing the bar $a^{39}$ from the lug of the arm $a^{34}$ and permitting the latter to be swung upward by its spring into position to engage the clutch pawl at the end of a single revolution, thus withdrawing the pawl from engagement with the clutch-disk and permitting the cam to come to rest. A spring $a^{45}$ secured to the gib $a^{14}$ has its bent end pressing against the periphery of this cam. As the pawl is withdrawn from the clutch disk, a rounded notch $a^{46}$ in the periphery of the cam is just passing beneath the bent end of the spring, resulting in a slightly further throw of the cam to cause the pawl to entirely clear the clutch disk. During the operation of this cam, the pawls $b^{10}$ and $b^{11}$ are held out of engagement with the ratchet $b^3$ by the lever arm $b^{20}$. The line having been inserted into the cut-off channel, these pawls are released by a lug $a^{47}$ on the rear side of the ejector plate $a^{13}$, (Fig. 5) having its rear lower face beveled. The ejector plate is given a rearward movement greater than necessary to clear it of the galley, during which movement the beveled face of this lug $a^{47}$ meets a pin $b^{26}$ fixed to the bell-crank arm $b^{19}$ and projecting through a hole in the frame $M^3$ into the path of the lug. The arm is thereby depressed, and the arm $B^{18}$ is permitted to click over it under the action of the straight wire spring $B^{19}$ acting on the rod $B^{16}$, maintaining the bell crank arm in such position that the curved lower end thereof no longer engages the pawls $b^{10}$ and $b^{11}$. On the next downward movement of the pawl $b^{11}$, the pusher will therefore commence its upward travel, advancing the just received line ahead of it. This upward movement of the pusher carries the line to the cut-off mechanism which separates a number of type from the upper end of the line and inserts them into a channel of the type carrier, in the manner now to be described.

*The cut-off mechanism.*—Referring to Figs. 1, 2, 5, 6, 10 and 12 to 15 inclusive; Directly in line above the cut-off channel an I-shaped opening $C^3$ (best shown in Fig. 12) is formed in the bottom plate $d^1$ of the carrier race-way. The rear edge of this opening lines up with the back of the channels in the carriers upon the race-way, and each channel in turn, as the carriers are advanced along the race-way, passes over this slot. Connecting the upper end of the cut-off channel with the lower end of the carrier channel directly above it, is the cut-off, formed of two $\sqsubset$-shaped members $C^1$ and $C^2$ located, as shown, to form a channel C between them to permit the passage of the line of type. These members are pivoted by screw studs $C^4$ and $C^5$ to the plate $C^6$ secured to the front edge of the frame $M^3$, their upper ends being capable of swinging around these pivots to the extent permitted by the width of the slot $C^3$. The hole in the left hand member $C^1$ through which the stud $C^4$ passes, is slotted, and springs $C^7$ and $C^8$ press this member toward the right hand member against the type T in the channel between them, thus regulating the width of this channel to the size of the type being distributed.

Behind the member $C^2$ is a shaft $c$ carried in bearings at $c^1$ in the plate $C^6$ and at $c^2$ in a rib $m$ of the frame $M^1$. A pin $c^3$ set eccentrically in the forward end of this shaft engages in a slot $C^9$ in the rear flange of the cut-off member. A coiled spring $c^4$ on this shaft, resting against a pin $c^5$, is tensioned by a collar $c^6$ secured by a set screw to the shaft, giving the shaft a tendency to rotate in a right-hand direction, thus tending to throw the cut-off toward the left. On the rear end of the shaft is a collar $c^7$ passing through the rib $m$ and adjustably secured to the shaft by a set screw. This collar carries a pin $c^8$ set in the end of the collar eccentrically, and projecting beyond the end of the shaft. Directly below this pin is a rod $c^9$ passing down through a hole in the frame $M^1$ and guided in a groove in the vertical frame $M^3$. This rod carries a roll $c^{10}$ adapted to be acted upon by a cam projection $c^{11}$ formed on the hub of the cam $d^{18}$ above referred to.

A small bar $c^{12}$, (Figs. 14 and 15,) slidable in a groove $c^{18}$ in the front plate $C^6$ is connected by a pin $c^{13}$ with the cut off member $C^2$, and has near its other extremity a square notch $c^{14}$. In front of this bar is secured a bracket $c^{15}$ carrying a block $c^{16}$ adjustably fastened thereto by the screw $c^{19}$. A pin $c^{17}$ passes through this block and through the rear portion of the bracket $c^{15}$, and when the cut-off member is moved by the cam $c^{11}$, rod $c^9$, and shaft $c$ to the right, the pin $c^{17}$ snaps into the notch in the rod, retaining the cut-off in its right-hand position against the action of the spring $c^4$. The pin $c^{17}$ is projected into the notch by means of a spring $c^{20}$ which bears against a shoulder on the vertical rod $c^{21}$, which is carried in bearings $c^{22}$, $c^{22}$ on the bracket $c^{15}$, and connected with the pin $c^{17}$ by means of the small bell-crank lever $c^{23}$ pivoted at $c^{24}$. This connection is such that when the rod $c^{21}$ is depressed, the pin $c^{17}$ is withdrawn from engagement with the notch in the bar $c^{12}$, permitting the cut-off to be thrown to the left by the action of the spring $c^4$. Secured to the front edge of the lower plate $d^1$ of the race-way is a vertical standard $c^{25}$ to the upper end of which is pivoted a lever $c^{26}$, having at the left end the beveled lug $c^{27}$ which overhangs the line of pins $D^{10}$ projecting from the top edges of the followers in the carriers. At the other end of this lever is a lug $c^{28}$ overhanging the upper end of the vertical rod $c^{21}$, so that as the left hand end of the lever is raised the rod is depressed, releasing the cut-off.

The relative positions of the cams $d^{18}$ and $c^{11}$ are such that when the carrier-advancing pawl has made its stroke to the right, the cut-off will also have been thrown to the right, and it is retained in this position by the parts just described; the channel through the cut-off being thus brought into exact alinement with the carrier-channel that is above it, as shown in Fig. 13. The carriers stand in this position throughout the greater portion of the revolution of the main shaft, due to the shape of the cam $d^{18}$.

Immediately following the location of the carrier channel and cut-off in alinement with each other, the cam $b^{16}$ heretofore referred to, begins to feed the line of type upward in the cut-off channel,— the cut-off proper having been, at the starting of the machine, filled with the type, bringing the upper end of the line of type flush with the top of the cut-off. The upper type in the cut-off are therefore elevated into the carrier channel, lifting the follower $D^9$ above them, until the pin $D^{10}$ lifts the lever arm $c^{26}$, thereby depressing the rod $c^{21}$ and releasing the cut-off, the spring $c^4$ at once tending to snap the cut-off toward the left. The right hand member of the cut off ends slightly below the bottom of the carrier, as shown in Fig. 15, leaving a gap between it and the bottom of the carrier feet $D^8$ somewhat less than the thinnest type. If, at the instant the cut-off is released, the bottom of the last type entered, or partially entered, into the carrier channel, is above the top of the right-hand side of the cut-off, the cut-off is permitted at once to snap to the left, carrying the type below the last entered type to a position beneath the wall separating that channel from the next one. Further advancement of the type in the cut-off is thereby prevented, the frictional drive of the cut-off pusher permitting it to come to rest, the cam $b^{16}$ and ratchet $b^3$ meanwhile making their full stroke. If, however, as is frequently the case, the cut-off be released at the moment that a wide type is only partially entered into the carrier-channel, such a type will impede the action of the cut-off, being pressed against the left hand side of the carrier channel by the right hand side of the cut-off, until the continued advancement of the cut-off pusher raises that type above the top of the member $C^2$, when the cut-off is free to snap to the left, preventing the introduction into the channel of more type. The subsequent advancement of the carriers moves the pin $D^{10}$ from beneath the lug $c^{27}$ of the lever-arm $c^{26}$, permitting the cut-off to be retained in alinement with the next carrier channel upon the next rotation of the shaft L. As the end walls $D^5$ of the carriers pass over the cut-off, the pins $D^{11}$ raise the lever $c^{26}$, unlocking the cut-off before the cut-off pusher begins to act, the feet $D^8$, on the bottom of the end walls of the carriers preventing any elevation of the type. The cams $b^{16}$ and $d^{18}$ are so proportioned that upward pressure on the line of type in the cut-off is removed before the carriers begin to advance. In this manner a predetermined amount of type is inserted into the successive channels of the carriers as they pass above the cut-off. When the cut-off pusher has risen the length of the line being distributed, it is released and drops down, a new line is inserted in the cut-off channel and the pusher is thrown into operation again in the manner hereinbefore described. This operation requires three revolutions of the main shaft; three channels will therefore pass over the cut-off without receiving any type, each time a new line is supplied to the cut-off channel. These empty channels will probably be supplied with type the next time they pass the cut-off, the stoppage of the feed to supply a new line occurring at irregular intervals.

More type is inserted into the carriers than is ordinarily distributed out of them in a single trip through the machine. The second time the carrier channels come above the cut-off, enough type will be inserted below the type remaining therein to supply the place of the type distributed out of them on the preceding round. It may be that in one trip of a carrier channel only one or two type will be distributed out of it. The insertion therefore of one or two type into this channel below the type remaining therein will cause the release of the cut-off, bringing the amount of type in each carrier up to the predetermined amount at the commencement of each trip through the race way.

*Selecting and ejecting mechanism.*—In order to enable the mechanism to distinguish between the different characters of the font being distributed, the type of each character has a certain combination of nicks cut in its thin edge as heretofore mentioned. The column of type is placed in the galley with the nicks in the type toward the right as shown in Fig. 11, so that as the carriers advance the type along the race way, the nicked side of the type is in advance. The type, as it is passed along the raceway is presented to the action of selectors which control the operation of ejectors in such manner that an ejector is caused to act to eject type from the carrier when its nicks correspond with projections, or wards, on the selectors. This mechanism will now be described.

Referring to Figs. 2, 3, 7, 8, 9, 12 and 15. The upper frame $M^1$ is formed with transverse ribs $m^1$, on the top of which the plates $d^1$ and $F^2$ are secured. The plate $d^1$ has slots $d^{29}$ cut through it, spaced apart the same distance as the carrier channels. Grooves $F^4$ are formed in the thicker rear part of this plate, the bottom of the grooves being flush with the upper face of the thinnest portion of the plate. These grooves serve as guides for ejectors F, which are slidable therein and are covered over by the back wall $d^3$ of the race-way. One of these ejectors is in alinement with each carrier-channel when the carriers are in their position of rest. Pivoted by a vertical pin $F^5$ on each of these ejectors is an extension or tail piece $F^1$. These tail pieces lie in the grooves $F^6$ in the plate $F^2$ resting normally against the left hand side of the groove, the grooves being substantially wider than the tail pieces, as shown in Fig. 9. The tail pieces have upwardly extending lugs $F^7$, and grooves $F^8$ formed in their lower edges.

Extending between each two ribs $m^2$ of the frame and pivoted thereto by the pins $E^7$ passing through the lugs $E^6$ is a plate $E^5$ having an upwardly extending rib $E^8$ along its rear edge, and a strip $E^9$ secured to its forward edge. This rib and strip form bearings for rods $E^2$ which may rock therein, there being one of these rods below each slot $d^{29}$ in the plate $d^1$. Riveted to these rods are flat, rectangular plates E which project into the slots $d^{29}$ and have wards $E^1$ formed on their upper edges. These wards correspond in position to the nicks in the type that are to be distributed at the point at which the plate is located. To the rear ends of the rods $E^2$ are secured by the screw studs $E^4$, small lever-arms $E^3$, the upper ends of which engage in the slots $F^8$ in the lower edges of the ejector tails $F^1$ a short distance from the pivots $F^5$.

Springs $E^{10}$ carried by screw studs $E^{11}$ in the frame $M^1$ tend to raise the plates $E^5$ until stopped by the strips $E^9$ impinging against the under side of the plate $d^1$. In this position the wards on the selector-plates project slightly above the upper face of the plate $d^1$. These selector plates are, however, normally depressed until the upper ends of the wards are slightly below the top of the plate $d^1$, by means of rods $e$, the T-head of which engage T-slots in the bottom of the plates $E^5$. These rods have sliding bearings in the frame $M^1$ and have notches formed at $e^1$ which are engaged by lever arms $e^2$ secured to a rock shaft $e^3$. Near the right hand extremity of this rod is a cam lever $e^4$, carrying a roll $e^5$ acted upon by the cam $e^6$ on the shaft L. As the portion of the face of the cam of decreased radius passes the roll, the plates are raised by the springs $E^{10}$. This motion is very slight, being only enough to project the wards above the face of the plate and into the path of the type.

Wire springs $E^{12}$ passing through holes in the forward ends of the rods $E^2$ and hooked to pins $E^{13}$, tend to keep the selector plates against the left-hand side of their slots; and, through the levers $E^3$, hold the ejector tails against the left hand side of their grooves.

The carrier-advancing cam $d^{18}$ is formed with two faces of decreasing radius, $d^{29}$ and $d^{30}$, connected by a concentric portion $d^{31}$. The first decreasing face $d^{29}$ advances the carriers until a partition wall between the carrier channels stands above each of the selector plates. While the concentric face $d^{31}$ is passing the roll $d^{23}$, the carriers make a slight pause, during which the decreasing face $e^7$ of the cam $e^6$ permits the selectors to rise, their wards being projected into the groove $D^7$ formed on the bottoms of the channel walls. The selector wards thus stand in advance of the type in the carrier channels, in such position that, as the second decreasing face $d^{30}$ of the cam $d^{18}$ advances the carriers to the limit of the throw of the advancing-pawl, any selector, the wards of which do not correspond with the nicks of the type engaged by it, will be advanced with the type, rocking the rod $E^2$. If the wards correspond with the nicks of the engaged type, they will be received in the nicks and the selectors will not be advanced, the two selectors shown in Fig. 15 illustrating the two positions. As the rods are thus rocked by engaged selectors, the levers $E^3$ swing the tail pieces of the ejectors toward the right, the movement of the rear end of the tail piece being considerably greater than the movement of the selector, in virtue of the engagement by the lever $E^3$ near the pivot $F^5$. The tail pieces of any ejectors the rods of which are not thus rocked, remain in their normal position, and are thereafter engaged by an ejector-bar, which drives forward the ejector to push the bottom type out of the carrier channel in alinement therewith, in the manner now to be described.

The ejector-bar just referred to consists primarily of an L-shaped bar $f$ resting on the plate $F^2$, and extending lengthwise of the machine over all the ejector tails. It is guided by gibs $f^2$; and is capable of forward and rearward movement sufficient to actuate the ejectors to shove the type from the carriers. Loosely supported on the rear face of this bar are strips $f^1$, held in place by screws $f^3$ passing through the slots $f^4$, permitting them a slight up and down movement. The lower edges of these strips are provided with beveled ribs $f^5$, notched as shown, thereby forming downwardly projecting teeth $f^6$, each of which stands normally in line with the upwardly projecting lug $F^7$ of the ejector tails. The strips $f^1$ extend across all the ejector tails. They are made in short lengths simply as a matter of convenience. Rearwardly extending bars $f^7$ are secured to the bar $f$ by screws at $f^8$. These bars are bent downward and then rearward, and have a sliding bearing in grooves $m^3$ in the ribs $m^2$ of the frame, in which they are held by the return track $G'$. Gear teeth $f^9$ on the under face of these bars mesh with spur gears $f^{10}$ secured to a shaft $f^{11}$ carried in bearings $f^{12}$ fastened to the rear edge of the frame $M'$. A coil spring $f^{13}$ on this shaft, engaging one of the bearings and the gear $f^{17}$ (Fig. 3) secured to the shaft, tends to rotate the shaft thereby to move the ejector bar forward. This spring is opposed by a link $f^{15}$ which has gear teeth $f^{16}$ at its upper end meshing with the gear $f^{17}$ secured to the shaft with which it is held in engagement by the bracket $f^{26}$ hung on the shaft $f^{11}$. The lower end of this link yokes around the main shaft, and carries a roll $f^{18}$ acted upon by the cam $f^{19}$ secured to the main shaft L. As this cam rotates, the decreasing face $f^{20}$, passing the roll on the link permits the ejector bar to advance slightly, under the action of the spring $f^{13}$, after which it pauses while the concentric face $f^{21}$ is passing the roll, and then advances for the full length of its stroke during the passage of the decreasing face $f^{22}$. The increasing face $f^{23}$ withdraws the ejector bar to its original position.

The operation of these parts is as follows: While the concentric portion $f^{24}$ of the cam $f^{19}$ is passing the roll on the link $f^{15}$, the ejector bar stands in its rearmost position. At this time the carriers are all advanced on the race way one step. The selectors rise into the path of the type during the advancement, as hereinbefore described, and, if their wards do not correspond with the nicks of the type engaged they are advanced slightly by the type, rocking the rods $E^2$, and swinging the ejector tails about their pivots sufficiently to move the lugs from their normal positions in line with the teeth $f^6$ of the ejector bar strips $f^1$ to a position in line with the intervals between these teeth. One of these ejector-tails so displaced is shown at $F^{10}$ in Fig. 9. When the wards correspond with the nicks of the type engaged thereby the selectors are not thus moved. As the first decreasing face $f^{20}$ of the cam $f^{19}$ passes the roll the ejector-bar advances a short distance, engaging the lugs on the ejector-tails that have not been moved out of the path of the corresponding ejector-bar teeth, thereby advancing the ejector; the teeth passing by the side of the ejector-tail lugs that have been swung from their normal positions by the engagement of the type with the selectors. The forward ends of the ejectors F stand normally a short distance behind the rear ends of the type in the carrier channels, as shown in Fig. 8; and in this first advancement, the ejector stops short of engagement with the type. Thereafter, while the concentric portion $f^{21}$ of the cam $f^{19}$ is passing the roll $f^{18}$, the increasing face $e^3$ of the cam $e^6$ lowers all the selectors out of the path of the type. Before the selectors are depressed the teeth $f^6$ of the ejector bar strips have passed the lugs of the unengaged ejector tails, rendering engagement of these selectors on this stroke of the ejector bar impossible. The further forward movement of the ejector-bar thereupon completes the advancement of the engaged ejectors, causing them to shove the lowest type in the corresponding carrier-channel out of that channel, beneath the bar $d^2$ which extends across the front of all the carriers. This bar is made in sections supported on the studs $d^{32}$, and is notched to different depths on its lower edge in accordance with the thickness of the type to be ejected at the various points, forming thereby openings $d^{33}$ through which one type at a time only may be ejected from any channel. As the ejector bar is drawn backward by the cam $f^{19}$ after completing its forward stroke, a rib $f^{25}$ on the underside of this bar engages the lugs on the ejector tails that have been driven forward, and returns them to their initial position, the beveled rib $f^5$ causing the strips $f^1$ to lift up over the lugs of the ejector tails that were not thus advanced, it being understood that when the selectors were lowered out of engagement with the type, as above described, the ejector tails displaced to the right by engagement of the type with the selectors, were at once swung back to their normal positions by the springs $E^{12}$ on the forward end of the rods $E^2$.

As many type are ejected at each operation as correspond with the selectors engaged, the bottom type in each carrier being tested by the successive selectors until it comes to the selector bearing a combination of wards corresponding to the combination of nicks on that type. After that type is ejected, the next type above it, now resting upon the plate $d^1$, is similarly treated. Thus the bottom type and as many immediately above it are distributed from each channel in passing through the machine as happen to be in the same order (one above the other) as the corresponding selectors. If the bottom type in any channel is one to be distributed at the far end of the carrier race-way it may be the only type distributed on that trip of the channel. On an average, however, a number of type are distributed from each channel each time it passes through the race-way, the number depending on the number and arrangement of the selectors.

The forward, or face, end of the type as it is ejected from the carrier, is received on top of plates H, the upper edges of which are located just below the line on which the type are ejected. These plates, made in sections for convenience of construction, are supported on brackets $H^1$, secured to the frame $M^1$, and are held in place by set screws $H^2$. They may be set further in or out by means of the screws $H^9$ to accommodate them to different widths of type. Opposite these plates are plates $H^3$ secured to the frame $M^1$ into which projecting strips $H^4$ are mortised. These strips extend into corresponding slots in the plates H, forming channels $H^5$ through which the type may descend. The face-end of the type being supported by the front plate H after the foot end is shoved clear of the rear plate $H^3$ by the ejector, the foot end tips downward, and the type descends foot foremost through the channel H⁵. The upper ends of the plates H and H³ are formed as shown, to provide a trough H⁶ in which the type may tip from the horizontal to the vertical position, in the manner familiar in this art. A strip H⁷ is carried by each of the plates H, which extends across above the trough H⁶, and prevents the type from turning from their flat sides onto their edges as they tip from the horizontal to the vertical position.

Type cases K, (Figs. 1, 4 and 7,) of any convenient form are placed upon a table $k$, supported on the bar $k^1$ secured to the frame of the machine and on the arms $k^2$. These cases are divided into channels which aline with the channels H⁵. A bar $k^3$ having sliding bearings in the blocks $k^4$ is connected by lever arms $k^5$ at either end with a rock-shaft $k^6$, having bearings in lugs $k^7$ depending from the bar $k^1$. A spring $k^8$ tends to force this bar forward. The cam $f^{19}$ on the main shaft acts through a roll $k^{10}$ on the lever arm $k^{11}$ secured to the rock shaft $k^6$ and moves the bar rearward against the action of the spring, the spring and the cam communicating a continuous reciprocating movement to the bar. Pins $k^{12}$, projecting from the bar, pass through holes in the ends of the type cases, and as the distributed type fall into the channels of these cases, the pins, on the next forward stroke of the bar $k^3$ shove the type along the channels, either against a follower K² placed in each channel or against the previously distributed type.

*Distribution of the secondary font.*—The type to be distributed are, as hereinbefore mentioned, prepared with nicks cut in one of their thinner edges as shown in Fig. 20. In the present machine three nicks are used in each combination. Where two fonts of type are used in the same matter, provision is made for separating one of these fonts from the other during the distribution. The primary font (that is the font making up the body of the matter, as, for instance, Roman) is distributed, each letter in its own channel, at the first passage of the type through the machine. The type of the other or secondary font (as, for instance, italics) are removed by the machine and placed in channels made to receive them, all characters together. After a considerable amount of this secondary font has been accumulated, containing cases for this font are substituted in the machine for the primary font cases, and these type by themselves are run through the machine a second time, an adjustment being given to the selecting mechanism to cause it to distribute these characters, each into its own channel. In order that the same selectors may thus distribute different fonts used together, a special system of nicks is required. In laying out the scheme of nicks, the length of the type is divided into equal zones each of the width required for a nick. These zones are numbered consecutively commencing at the foot of the type. Combinations are then selected for the primary font, made up of three nicks, the zones of all of which bear even numbers; or else they bear two odd and one even number. In the ordinary font it is generally necessary to use combinations of nicks of both of these kinds to secure the necessary number of different combinations. The corresponding characters in the secondary font are nicked with the same combinations of nicks moved upward on the type one zone, so that these characters all have combinations in which the numbers of the zones occupied by the nicks are either three odd numbers, or two even and one odd number. The combination of nicks on any character of the primary font are thus complementary to the nicks on the corresponding character of the secondary font; that is to say, if the primary font character has a combination of nicks the numbers of the zones of which are all even, the secondary font characters will have nicks the numbers of which are all odd; or two of the nicks being even and one odd in one font, the nicks of the same character in the other font will be two odd and one even. It follows therefore that a selector which fits the nicks of a character of the primary font will not, at the same time fit the nicks of any character of the secondary font. The secondary characters are further provided with a nick as $t'$, Fig. 20, either near the foot or the face end of the type, outside of the range of any of the nicks otherwise used on either font. These nicks are herein referred to as font-distinguishing nicks. They cause the removal of the secondary characters all at the same place in the machine. When it is desired to distribute the secondary font thus separated from the primary, they are placed in the distributing galley and run through the machine a second time, the selectors by a simple adjustment all having been moved over the width of one nick to bring them from a position corresponding to the nicking of the primary font to a position corresponding with the nicking of the secondary font.

The characters of the secondary font of type are divided according to their thickness, into a number of groups (in this case three), and all of the characters in each of these groups are nicked with a font-distinguishing nick, this nick being in different positions for each of the three groups. The last three selectors toward the right hand end of the machine are provided with wards each of which corresponds to the font-distinguishing nick of the three groups, respectively. Each of these selectors, therefore, causes the ejection of type of the secondary font of approximately the same thickness, this being necessary to prevent the ejection of more than one type at a time beneath the strip H⁷. The type thus ejected are collected in a case K³ of three channels located at the right hand side of the type case table k. A considerable quantity of these type having thus been collected they are removed from the case, broken up into lines of approximate lengths and placed in the distributer galley to be distributed into their respective channels of type cases substituted for the primary font cases on the type case table, as hereinafter explained.

The slots $d^{29}$ through which the selector plates E project are longer than the selector plates by the width of one type nick. The rods E² carrying the selector plates are permitted a slight longitudinal movement in their bearings. A rock shaft E¹⁶ which has bearings in the ribs $m^2$ of the frame M¹ has secured to its flattened face comb springs E¹⁷. The ends of these springs engage annular grooves E¹⁸ in the screw studs E⁴ in the rear ends of the selector plate rods. On the right hand end of the rock shaft E¹⁶ adjacent to the end of the frame M¹ is a hand lever E¹⁹ by which the shaft may be rocked. By raising this lever the comb springs are thrown to the rear, drawing the selector plates against the rear ends of the slots $d^{29}$. This is their position for the distribution of the primary font. When distributing a secondary font the hand lever is depressed, causing the comb springs to rock forward and press the selector plates against the forward end of the slots $d^{29}$. This causes the wards on the selector plates to aline with the nicks of the corresponding characters in the secondary font, it having been heretofore explained that the nicks of the secondary font are the same combinations as the nicks of the primary font except that they are moved one division higher up on the length of the type. The secondary font is therefore distributed in exactly the same manner as the primary font.

*Power.*—The machine is driven by a belt passing over a pulley L', Figs. 1 and 23. This pulley turns freely on the shaft L. Secured to the shaft is a disk L¹ which, coacting with the pulley, forms a friction clutch to communicate movement to the shaft. Seated in the rim of the disk are two diametrically opposite shoes L³. The disk with these shoes is located inside of the pulley, as shown, and the pulley normally turns freely about the disk. A collar L⁵, loosely carried on the shaft between the pulley and the disk, is secured to two rods L⁶ which pass through the hub of the disk, and carry on their outer extremity a grooved disk L⁷. Rods L⁸, seated in holes in the collar L⁵, pass through holes in the flange of the disk and bear upon setscrews L⁹ in the shoes L³, forming a toggle joint as shown. The grooved collar L⁷ is engaged by rolls L¹⁰ on studs L¹¹ secured to the yoked end of an arm L¹². This arm is secured to the shaft L¹³ which is journaled in the bracket L¹⁴. On the outer end of this shaft is an arm L¹⁵ which is connected by a long link L¹⁶, arm L¹⁷ and shaft L¹⁸, with a hand lever L¹⁹ located in a convenient position at the galley end of the machine, for throwing the clutch into operation. Downward movement of this arm causes the collar L⁵ to be moved to the left, straightening out the toggle joint and pressing the shoes L³ into firm frictional contact with the pulley L. The clutch is locked in its operative position by a bolt l, (Figs. 6 and 11), having sliding bearings in the blocks $l^1$, $l^1$ and drawn forward by a spring $l^8$. Its forward end engages a shoulder L²⁰ on the rear side of the hand lever. The clutch may be released by moving this bolt rearward, when a spring L²¹, (Fig. 1), attached to the lever arm L¹⁷ and the frame, draws this link and connecting parts to the right, breaking the toggle joint.

It is desirable to provide mechanism for automatically throwing off the power in case of obstruction to the working parts of the machine. Such obstruction occurs only when a type is improperly entered into or ejected from a carrier channel, resulting in the locking of the series of carriers against further advancement. Pivoted near the rear end of the bolt l heretofore referred to which locks the power clutch in operative position, is a plate $l^2$ having an L-shaped extension $l^3$. This plate is normally pressed upward by a spring $l^4$ seated in a hole in the bolt. Carried in bearings $l^5$ is a rod $l^6$, the lower end of which rests upon this plate. A collar $l^7$ near the upper end of this rod is normally in the path of the arm $d^{34}$ extending from the link $d^{21}$ heretofore referred to, which actuates the carrier advancing pawl. This link is pulled downward to advance the carriers by the spring $d^{19}$ as heretofore described. Near the end of its full stroke the arm $d^{34}$ strikes the collar $l^7$ depressing the rod $l^6$ and with it the plate $l^2$. Pivoted to the frame M³ is a bell crank lever $l^9$, the horizontal arm $l^{10}$ of which extends into the path of a pin $d^{35}$ secured to a cam $d^{18}$. The lower arm $l^{11}$ of the bell crank lever stands normally adjacent to the L-shaped projection of the plate $l^2$. A spring $l^{12}$ returns the lever arm to its normal position when moved by the pin $d^{35}$. The pin $d^{35}$ is so located on the cam $d^{18}$ that the lower end of the bell crank lever is swung to the rear just after the link $d^{21}$ completes its downward stroke. In the normal operation of the machine, the plate $l^2$ will be pressed out of the path of the lower end of the bell crank lever before the latter makes its stroke. If, however, the advancement of the carriers is in any way impeded, either by an improperly ejected type or otherwise, the spring $d^{19}$ will not be permitted to draw the link $d^{21}$ all the way down. The plate $l^2$ will not therefore be depressed out of the path of the arm $l^{11}$ which upon its next stroke will engage the L-extension of this plate drawing it and the bolt $l$ rearward, releasing the hand lever $L^{19}$. The spring $L^{21}$ thereupon releases the power clutch as hereinbefore explained. It is furthermore desirable that in case the carriers are so impeded at any time as to fail to reach the full extent of their movement, the ejector bar $f$ should not be permitted to make its stroke. For this purpose a hooked piece $d^{36}$, (Figs. 2, 5 and 10), adjustably secured to the rear side of the carrier-advancing cam plate bar $d^{14}$, overhangs the end $d^{37}$ of the lever $d^{38}$, pivoted to the back wall of the race way at $d^{39}$. This lever carries a rod $d^{40}$, the end of which stands in front of the upwardly extending portion of the ejector bar $f$ when the bar is in its rearmost position. As the cam plate $d^{14}$ descends to its lowest position the hook $d^{36}$ engages the short end of the lever $d^{38}$ raising the other end to lift the rod out of the path of the ejector bar. If, however, the carriers are in any way obstructed so as to prevent the cam plate $d^{12}$ from making its full downward movement, the rod $d^{40}$ will not be lifted above the ejector bar, thereby preventing the advancement of the ejectors.

I claim:

1. In a distributing machine, in combination carriers adapted to convey type, selectors capable of movement in the direction of travel of the type and adapted to enter the path of the type in advance of the type to be selected thereby and be moved or not with the type according to whether the type fit the wards of the selectors, and ejecting mechanism governed by such movement of the selectors.

2. In a distributing machine, in combination, selectors capable of movement in the direction of travel of the type and adapted to enter the path of the type and be moved or not with the type when the wards of the selectors do not or do correspond respectively with the type, ejecting mechanism governed by such movement of the selectors, and means for withdrawing the selectors from the path of the type.

3. In a distributing machine, in combination carriers adapted to move type along a race way, selectors capable of movement in the direction of travel of the type and adapted to enter the path of the type and be moved or not with the type according to whether the type fit the wards of the selectors, and mechanism adapted to actuate the ejectors corresponding to the selected type.

4. In a distributing machine, in combination carriers adapted to move type along a race-way, ejectors, an ejector bar adapted to actuate the selected ejectors, and a series of selectors having wards adapted when in the path of the type to be moved or not in the direction of travel of the type according to the nicking of the type, to select the ejectors for action.

5. In a distributing machine, in combination carriers adapted to move type along a race-way, ejectors, an ejector bar adapted to drive the selected ejectors, and a series of selectors having wards adapted when in the path of the type to be moved or not according to the nicking of the type to select the ejectors for action, and means for moving said wards into and out of the path of the type.

6. In a distributing machine, in combination carriers adapted to move type along a race-way, ejectors, ejector driving mechanism, selectors adapted to control the presentation of said driving mechanism to the ejectors, said selectors being adapted to stand in the path of the type and be moved in the direction of travel of the type and be thus controlled by the nicking of the type.

7. In a distributing machine, in combination carriers adapted to move type along a race-way, ejectors, ejector driving mechanism, selectors adapted to control the presentation of said driving mechanism to the ejectors, said selectors being controlled by the nicking of the type, and means for moving the series of selectors into the path of the type in advance thereof and thereafter out of the path of the type.

8. In a distributing machine, in combination, ejectors, an ejector bar having teeth adapted to engage or miss the ejectors, selectors having wards corresponding to the nicking of the type, connections between said selectors and said ejectors to move the latter to govern the engagement of the ejector bar therewith.

9. In a distributing machine, in combination, selectors mounted upon rockshafts, ejectors and connection between the rockshafts and the ejectors; whereby the ejectors are moved, and an ejector bar caused to engage or miss the ejectors according to their position.

10. In a distributing machine, in combination, selectors, rock shafts therefor, ejectors moved thereby and having lugs, an ejector bar having teeth adapted to engage or miss the lugs on the ejectors according to the position of the latter.

11. In a distributing machine, in combination carriers adapted to move type along a race-way, a series of selectors, a movable frame carrying the same, ejecting mechanism governed by said selectors, and means for moving said frame to bring the selectors into position to be engaged by and advanced with the type and to remove them from that position.

12. In a distributing machine, in combination, a series of selectors, a movable frame carrying the same, ejectors, a toothed ejector bar, connections between the selectors and the corresponding ejectors to govern the presentation of the letter to the ejector bar, and means for moving said frame to bring the selectors into position to coöperate with the type and thereafter to remove them from that position, the proper presentation of the ejectors to the ejector bar having been in the meantime effected.

13. In a distributing machine, in combination, ejectors, pivoted tails therefor, selectors, connections between the same and the tails of said ejectors, and ejector driving mechanism adapted to engage or miss the ejectors according to the position of said tails.

14. In a distributing machine, in combination, ejectors having pivoted tails, with lugs thereon, an ejector bar having teeth, means for swinging the tails to bring them into or out of alinement with said teeth, and selectors for causing such swinging.

15. In a distributing machine, in combination, ejectors having pivoted tails, with lugs thereon, an ejector bar having teeth, means for swinging the tails to bring them into or out of alinement with said teeth, and selectors for causing such swinging, and a movable frame for carrying the selectors, and means for moving said frame to present the selectors to the type and thereafter withdraw them therefrom.

16. In a distributing machine, in combination, ejectors, driving mechanism therefor, selectors for governing the presentation of the ejectors to the driving mechanism, means for presenting the selectors to the type, means for then giving the ejector driving mechanism a primary movement to cause the engagement of the selected ejectors means for thereafter withdrawing the selectors from the type, and means for thereafter completing the movement of said driving mechanism.

17. In a distributing machine, in combination, selectors, rock shafts carrying the same, a removable frame on which said rock shafts are mounted, ejectors, connections between the same and said rock shafts, ejector driving mechanism whose presentation to the ejectors is governed according to their position controlled by the selectors, and means for moving said frame before and after the positioning of the ejectors to present the selectors to the type and withdraw them therefrom.

18. In a distributing machine, in combination, ejectors having lugs, an ejector bar having projections both in front of and behind said lugs, the projections behind the lugs being alternated with open spaces, and means governed by the type for moving the ejectors laterally to govern the presentation of their lugs to the projections at the rear thereof.

19. In a distributing machine, in combination, a series of selectors, a frame carrying the same, a spring pressing said frame in the direction to move the selectors into the path of the type, ejecting mechanism controlled by the selectors while in said path, and means for thereafter withdrawing the selectors from said path.

20. In a distributing machine, in combination, a series of selectors, rock-shafts therefor, a frame in which said rock shafts are mounted, a spring tending to press said frame into a position where the selectors may engage the type, and ejecting mechanism governed by the rocking of said shafts.

21. In a distributing machine, in combination, a series of selectors, rock shafts therefor, a frame in which said rock shafts are mounted, a spring tending to press said frame into a position where the selectors may engage the type, ejectors, connections between the same and said rock shafts, and a toothed ejector bar adapted to engage the ejectors or miss them according to the position given the ejectors by the rock shafts.

22. In a distributing machine, in combination, carriers adapted to convey type, selectors having wards adapted to be presented to the type therein and be moved or not with the type according to whether the nicks of the latter correspond to the wards, and ejecting mechanism moved out of operative position by the movement of the selectors.

23. In a distributing machine, in combination, carriers adapted to convey type, means for moving the same intermittently, selectors, means for causing the same to enter and leave the path of the type, and ejecting mechanism moved out of operative position by the movement communicated to the selectors by the movement of the type.

24. In a distributing machine, in combination, carriers divided into channels, each to hold several type, selectors adapted to be presented to the bottom type in the channels successively and be moved or not by the advancement of the type according to whether they correspond to the nicking of the bottom type, means for ejecting the bottom type, and controlling mechanism therefor actuated by the movements of the corresponding selector.

25. In a distributing machine adapted to distribute two fonts of type, the combination of mechansim for separating the primary font individually and the secondary font collectively, and mechanism for readjusting the machine to thereafter separate the secondary font individually.

26. In a distributing machine adapted to distribute two fonts of type, the combination of individual selectors for each character irrespective of the font, a common selector for separating the secondary font, and means for readjusting the individual selectors with reference to the type to cause them to distribute the secondary font.

27. In a distributing machine adapted to distribute two fonts of type, the combination of individual selectors for each character, a plurality of common selectors for separating the secondary font into groups according to the general thickness of the type, and means for readjusting the mechanism to cause the individual selectors to select the secondary font.

28. In a distributing machine adapted to distribute two fonts of type, the combination of individual selectors adapted to cause the distribution of one font and means for adjusting the selectors to cause them to distribute the other font.

29. In a distributing machine adapted to distribute two fonts of type, the combination of selectors normally set to cause the distribution of the primary font, means for changing their position relatively to the type to cause the distribution of the secondary font.

30. In a distributing machine adapted to distribute two fonts of type, the combination of a series of individual selectors for different characters, with means for adjusting them as a whole for different fonts.

31. In a distributing machine adapted to distribute two fonts of type, the combination of a series of individual selectors, means for adjusting them as a whole for different fonts, and means for separating without distribution but into groups according to thickness the font for which the ejectors are not set.

32. In a distributing machine adapted to distribute two fonts of type, the combination of selectors adapted to coöperate with nicks in the type, and means for shifting the selectors a distance corresponding to one nick.

33. In a distributing machine adapted to distribute two fonts of type, the combination of selectors having two positions corresponding to the nicking of the primary and secondary fonts, and means for controlling the position of the selectors.

34. In a distributing machine adapted to distribute two fonts of type, the combination of selectors having two positions corresponding to the nicking of the primary and secondary fonts, means for controlling the position of the selectors, and ejecting mechanism governed by the selectors irrespective of which font the latter are adjusted to take.

35. In a distributing machine adapted to distribute two fonts of type, the combination of selectors having wards normally adapted to coöperate with the nicks of one font, means for adjusting the wards to correspond with the nicks of the other font, and ejecting mechanism controlled by the wards.

36. In a distributing machine adapted to distribute two fonts of type, the combination of selectors having wards adapted to move relatively transversely of the type to select the same and govern their ejection, and means for moving the wards longitudinally of the type to vary the font to be distributed.

37. In a distributing machine adapted to distribute two fonts of type, the combination of selectors having wards, means for giving them a unitary longitudinal position according to the font to be distributed, means for presenting the type to the wards, and ejecting mechanism governed by individual movement of the wards.

38. In a distributing machine adapted to distribute two fonts of type, the combination of rock shafts, selectors mounted thereon, ejecting mechanism controlled by the rocking of said shafts, and means for moving said selectors longitudinally to cause the distribution of a different font.

39. In a distributing machine adapted to distribute two fonts of type, the combination of rock shafts, a movable frame carrying the same, selectors secured to said rock shafts, ejecting mechanism controlled by said rock shaft, means for moving the frame to present the selectors to the type, and means for moving the rock shafts in the frame to change the font to be distributed.

40. In a distributing machine adapted to distribute two fonts of type, the combination of individual selectors adjustable for different fonts and a common selector provided with a ward corresponding with a font-distinguishing nick of the secondary font.

41. In a distributing machine adapted to distribute two fonts of type, the combination of individual selectors adjustable for different fonts and having wards corresponding to the character nicks of each font, and common selectors provided with wards corresponding to font-distinguishing nicks of the secondary font, there being a plurality of said common selectors to separate secondary fonts into groups.

42. The combination of two fonts of type to be used conjointly, the corresponding characters of each font having the same combination of nicks but featured differently in the two fonts, with distributing mechanism adjustable for the two fonts.

43. The combination of two fonts of type to be used conjointly, the corresponding characters of each font having the same combination of nicks but featured differently in the two fonts, with individual selectors adjustable for the two fonts.

44. The combination of two fonts of type to be used conjointly, the corresponding characters of each font having the same combination of nicks but featured differently in the two fonts, with individual selectors having wards coöperating with the nicks of the type and adjustable as a whole for different fonts of type.

45. The combination of two fonts of type to be used conjointly, the corresponding characters of each font having the same combination of nicks but positioned differently in the two fonts, with selectors for causing the distribution of the type, and means for shifting the selectors from the range of one font to that of the other.

46. The combination of two fonts of type to be used conjointly, the corresponding characters of each font having the same combination of nicks but positioned differently in the two fonts, with wards, means for presenting the same to the type whereby they are moved or not according to whether they register with the type ejecting mechanism controlled by such movement of the wards, and means for adjusting the wards as a whole relative to the type to take the wards out of range of one font and into range of the other.

47. The combination of two fonts of type to be used conjointly, the corresponding characters of each font having the same combination of nicks but positioned differently in the two fonts, with wards which move relatively transversely of the type to select the same, and means for moving the wards relatively longitudinally of the type to vary the font distributed.

48. The combination of two fonts of type to be used conjointly, the corresponding characters of each font having the same combination of nicks but positioned differently in the two fonts, with wards which move relatively transversely of the type to select the same, means for moving the wards relatively longitudinally of the type to vary the font distributed, and ejecting mechanism controlled by said wards irrespective of their longitudinal position.

49. The combination of two fonts of type to be used used conjointly, the corresponding characters of each font having the same combination of nicks but positioned differently in the two fonts, with carriers adapted to convey said type indiscriminately, wards to which the type are presented by the carriers, ejecting mechanism governed by the presentation of the wards to the nicks, mechanism for adjusting the position of the wards relative to the path of the carriers to vary the font selected.

50. The combination of two fonts of type to be used conjointly, the corresponding characters of each font having the same combination of nicks but positioned differently in the two fonts, with carriers adapted to convey said type indiscriminately, wards to which the type are presented by the carriers, ejecting mechanism governed by the presentation of the wards to the nicks, mechanism for adjusting the position of the wards relative to the path of the carriers to vary the font selected, one of said fonts having an additional font distinguishing nick and a common selector, and mechanism initiated thereby for causing the ejection of characters of the secondary font.

51. Two fonts of type adapted to be used conjointly, the corresponding characters of the different fonts having the same combination of nicks, but the nicks of one font having some different feature from those of the other, whereby the same selectors may distribute either font according to adjustment, combined with distributing mechanism having selectors with wards which correspond to the nicks of the respective type in both fonts and means for adjusting the distributing mechanism to change from one font to the other.

52. Two fonts of type to be used conjointly, the corresponding characters of each font having the same combination of nicks but positioned differently in the two fonts, combined with distributing mechanism having wards corresponding to the nicks of the respective type in both fonts, and means for adjusting the distributing mechanism to change from one font to the other.

53. Two fonts of type to be used conjointly, the corresponding characters of each font having the same combination of nicks but positioned differently in the two fonts, one of the fonts having a font-distinguishing nick, combined with distributing mechanism corresponding to both fonts, and means for adjusting the distributing mechanism to change from one font to the other.

54. Two fonts of type to be used conjointly, the corresponding characters of each font having the same combination of nicks but positioned differently in the two fonts, one of the fonts having a plurality of different font distinguishing nicks to separate this font according to size, combined with distributing mechanism having wards corresponding to the nicks of the respective type in both fonts, and means for changing from one font to the other.

55. Two fonts of type adapted to be used conjointly, the corresponding characters of the two fonts having the same combination of nicks, but the set of nicks in one font being located at a greater altitude than those of the other, the zones of nicking being so selected that no two sets of nicks in the two fonts will correspond both as to combination and position, combined with distributing mechanism having wards corresponding to the nicks of the respective type in both fonts, and means for adjusting the distributing mechanism to change from one font to the other.

56. Two fonts of type adapted to be used conjointly, the corresponding characters of the two fonts having the same combination of nicks but positioned differently in the two fonts, the nicks of the type occupying certain contiguous zones each the width of a nick, certain zones being selected for one font of type and the complementary zones being selected for the other font, the nicks of any character in one font being thus each one nick higher than the corresponding character in the other font and no two characters throughout the two fonts having the same system of nicking, combined with distributing mechanism having wards corresponding to the nicks of the respective type in both fonts, and means for adjusting the distributing mechanism to change from one font to the other.

57. Two fonts of type adapted to be used conjointly, the corresponding characters of the two fonts having the same combination of three nicks, the nicks of one font being located at a greater altitude than those of the other by the distance of one nick, the nicks of the type being located in any of the zones of equal width into which the length of the type is divided, the combinations all the nicks of which occupy odd numbered zones measuring from a given datum line being apportioned to one font and the even numbered zones to the other font, and the combination of two even zones and one odd zone being apportioned to one of the fonts and the complementary two odd and one even zone being apportioned to the other font of type, combined with distributing mechanism having wards corresponding to the nicks of the respective type in both fonts.

58. Two fonts of type adapted to be used conjointly, said type being theoretically divided into a series of zones, which may be considered as numbered serially from one end of the type, the corresponding characters of each font having the same combinations of nicks but placed in different zones, the zones selected for one font being complementary to those selected for the other, combined with distributing mechanism having wards corresponding to the nicks of the respective type in both fonts, and means for adjusting the distributing mechanism to change from one font to the other.

59. Two fonts of type adapted to be used conjointly, said type being theoretically divided into a series of zones, which may be considered as numbered serially from one end of the type, the corresponding characters of each font having the same combinations of nicks but placed in different zones, the zones selected for one font being complementary to those selected for the other, said zones being contiguous and being of a width equal to one nick whereby the corresponding characters of the different fonts have the same combination of nicks elevated in one font one nick higher than in the other, combined with distributing mechanism having wards corresponding to the nicks of the respective type in both fonts, and means for adjusting the distributing mechanism to change from one font to the other.

60. Two fonts of type to be used conjointly the different characters having differentiating characteristics which are related in the two fonts, combined with a distributing machine having means coöperating with said characteristics and adjustable to correspond with the characteristics of either font as desired.

61. In a distributing machine, circulating carriers each adapted to carry a plurality of type, means for supplying type thereto, said means being adapted to feed into the carriers on each trip through the machine an amount of type substantially equal to the type distributed therefrom on the previous trip.

62. In a distributing machine, in combination, a carrier, a shiftable channel through which the type is fed thereto, and means for automatically shifting said channel when the carrier contains a definite amount of type.

63. In a distributing machine, in combination, a carrier having a type channel, means for feeding several type together to said channel, and means for stopping the feeding when the type in the channel of the carrier reaches a definite amount.

64. In a distributing machine, in combination, carriers, a shifting channel leading thereto, means for feeding type through the channel to the carriers, and means for yieldingly shifting said channel to cut off the feed.

65. In a distributing machine, in combination, a carrier, a channel through which the type are fed thereto, and means for moving said channel to cause the end adjacent to the carrier to cut off the type.

66. In a distributing machine, in combination, a carrier having a series of type channels, a swinging channel with its swinging end adjacent to the carrier, a stationary channel in alinement with the swinging channel at its pivoted end and means for advancing type through said stationary and swinging channels into the carrier.

67. In a distributing machine, in combination, a type channel composed of two pivoted members between which the type is fed a channel to receive type fed therefrom, and means for swinging said members to cut off the feed.

68. In a distributing machine, in combination, a type channel composed of a pivoted member and another member spring pressed toward the same, the type being fed between the two a member to receive type therefrom, and means for swinging said channel to cut off the type.

69. In a distributing machine, in combination, a carrier, a shiftable channel through which the type are fed to the carrier, means for shifting said channel to cut off the feed to the carrier, the wall of said channel then operating as a gate to prevent the type falling out of the carrier.

70. In a distributing machine, in combination, a carrier, a shiftable channel through which the type are fed to the carrier, means for shifting said channel to bring it in line with the wall of said carrier whereby the feed is stopped.

71. In a distributing machine, in combination, traveling carriers, means for feeding type thereinto, a cut-off mechanism for the feeding means, and followers in the carriers adapted to engage said cut-off mechanism.

72. In a distributing machine, in combination, a type carrier provided with a follower, a shiftable type channel through which the type is adapted to be fed into said carrier, and operative connecting mechanism between the follower and channel to shift the channel when the follower has received the proper amount of type.

73. In a distributing machine, in combination, a carrier provided with a follower, a shiftable channel through which type may be fed to the carrier, a lever adapted to be operated by the follower, and connecting mechanism between the lever and the channel.

74. In a distributing machine, in combination, traveling carriers, means for feeding type thereinto, a cut off mechanism for the feeding means having a portion adapted to be engaged by means carried by the end walls of the carriers.

75. In a distributing machine, in combination, a carrier, a shiftable channel leading thereto, means for feeding type therethrough, means for giving said channel a tendency to shift when the type in the carrier has reached a definite amount, and means for thereafter continuing the feed until one edge of the type alines with the edge of the channel adjacent to the carrier, the channel thereupon swinging and cutting off the type.

76. In a distributing machine, in combination, a carrier, a shiftable channel leading thereto, means for intermittently moving the carrier with reference to the channel, means for feeding type through the channel to the carrier, means for giving the channel a tendency to shift, the feed continuing until the channel may clear the type, whereupon it shifts to stop the feed.

77. In a distributing machine, in combination, a carrier, a shiftable channel leading thereto, means for intermittently moving the carrier with reference to the channel, means for feeding type through the channel to the carrier, means for giving the channel a tendency to shift, the feed continuing until the channel may clear the type whereupon it shifts, the wall of said channel after shifting constituting a gate preventing the type falling out of the portion of the carrier just filled.

78. In a distributing machine, in combination, a type carrier having openings on three sides, a follower adapted to project out of one of said sides, selecting mechanism adapted to enter another of said sides, and ejecting mechanism adapted to force the type out of the third of said sides.

79. In a distributing machine, in combination, a type carrier divided by partitions into a series of channels, each adapted to carry several type, a rack secured to said carrier, mechanism engaging said rack to feed the carrier forward, and selecting mechanism presented to the bottom type in said channels.

80. In a distributing machine, in combination, a carrier, a rack thereon, means coöperating therewith for feeding the carrier along the distribution race-way, a frictionally driven chain, and means for causing the carrier at the end of said race way to engage said chain and be thereby carried around a return path to repeat its operation.

81. In a distributing machine, in combination, a series of carriers each having a rack, mechanism engaging the rack of one carrier to shove along that carrier and all ahead of it on the distribution race-way, a return race-way and a frictionally driven chain adjacent thereto, and means for causing each carrier as it reaches the end of the distribution race-way to engage said chain and be returned thereby.

82. In a distributing machine, in combination, a horizontal distribution race-way, a series of carriers adapted to be fed along the same, a return race-way substantially parallel with the distribution race-way, and connected at each end therewith by a substantially semi-circular track, and means for feeding the carriers step by step along the distribution race-way, and means for returning said carriers by continuous movement along the return race-way.

83. In a distributing machine, in combination, a carrier, means for feeding it along a distribution race-way, a return race-way, a frictionally driven chain adjacent thereto, a pin carried by the carrier, and means for causing the same to engage said chain to return the carrier.

84. In a distributing machine, in combination, a carrier, means for feeding the same along a distribution race way, a notched frictionally driven chain for returning the carrier by another path, a pin mounted on the carrier adapted to engage a notch of said chain, and a guide for holding said pin out of the way while the carrier is traveling on the distribution race-way.

85. In a distributing machine, in combination, a carrier, ejectors, means for advancing the carrier, means for operating the ejectors, and mechanism for throwing off the power of the machine and locking the ejector operating mechanism when the carrier is impeded.

86. In a distributing machine, in combination, a carrier, ejectors adapted to shove type therefrom, an ejector bar for operating said ejectors, a part interposed in the path of the ejector bar, mechanism for advancing the carrier, and means whereby such advancing mechanism at the end of its stroke removes said interposed part.

87. In a distributing machine, in combination, ejectors, a reciprocating ejector bar, and automatically controlled selectors having wards adapted to be moved by the type and thereby move the ejectors out of engaging position with the ejector bar when the wards do not correspond with the nicks of the type.

88. In a distributing machine, in combination, ejectors, a periodically moving hit or miss driving mechanism therefor, and selectors having wards adapted to be moved by the type to move the ejectors out of engaging position.

89. In a distributing machine, in combination, ejectors having lugs, an ejector bar carrying a longitudinal series of teeth overlapping the lugs of the ejectors, and automatically controlled selectors whereby the engagement of the lugs and teeth is controlled.

In testimony whereof, I hereunto affix my signature in the presence of two witnesses.

FRANCIS B. CONVERSE, Jr.

Witnesses:
   J. B. HULL,
   B. W. BROCKETT.